(12) United States Patent
Zhou et al.

(10) Patent No.: US 11,748,449 B2
(45) Date of Patent: Sep. 5, 2023

(54) DATA PROCESSING METHOD, DATA PROCESSING APPARATUS, ELECTRONIC DEVICE AND STORAGE MEDIUM

(71) Applicant: Beijing Baidu Netcom Science and Technology Co., Ltd., Beijing (CN)

(72) Inventors: Yao Zhou, Beijing (CN); Guowei Wan, Beijing (CN); Shenhua Hou, Beijing (CN); Shiyu Song, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 352 days.

(21) Appl. No.: 17/105,027

(22) Filed: Nov. 25, 2020

(65) Prior Publication Data

US 2022/0164603 A1   May 26, 2022

(51) Int. Cl.
*G06V 10/22* (2022.01)
*G06F 18/214* (2023.01)
*G06N 3/08* (2023.01)
*G06F 18/22* (2023.01)
*G06F 18/2415* (2023.01)

(52) U.S. Cl.
CPC .......... *G06F 18/2148* (2023.01); *G06F 18/22* (2023.01); *G06F 18/2415* (2023.01); *G06N 3/08* (2013.01); *G06V 10/22* (2022.01)

(58) Field of Classification Search
CPC .. G06F 18/2148; G06F 18/22; G06F 18/2415; G06V 10/22; G06N 3/08

USPC .......................................................... 382/159
See application file for complete search history.

(56) References Cited

U.S. PATENT DOCUMENTS

| | | | | |
|---|---|---|---|---|
| 2019/0329407 | A1* | 10/2019 | Qi | .................. G05D 1/0234 |
| 2020/0372672 | A1* | 11/2020 | Schonberger | .......... G06V 20/10 |
| 2021/0166418 | A1* | 6/2021 | Zhou | .................. G06K 9/62 |
| 2021/0237764 | A1* | 8/2021 | Tang | .................. G06T 7/75 |
| 2022/0084228 | A1* | 3/2022 | Gorban | .............. G05D 1/0088 |

* cited by examiner

*Primary Examiner* — Michael R Neff

(74) *Attorney, Agent, or Firm* — Seed IP Law Group LLP

(57) ABSTRACT

The present disclosure provides a data processing method, an apparatus, an electronic device and a medium, which relates to the technical fields of autonomous driving, electronic maps, deep learning, image processing, and the like. The method includes: a computing device inputs a reference image and a captured image into a feature extraction model; obtain, a set of reference descriptors based on the first descriptor map; determine a plurality of sets of training descriptors; obtain a predicted pose of the vehicle by inputting the plurality of training poses and a plurality of similarities into a pose prediction model; and train the feature extraction model and the pose prediction model. When applied to a vehicle localization system, the trained feature extraction model and pose prediction model according to some embodiments of the present disclosure can improve accuracy and robustness of vehicle localization, thereby boosting the performance of the vehicle localization system.

20 Claims, 18 Drawing Sheets

DATA PROCESSING METHOD, DATA PROCESSING APPARATUS, ELECTRONIC DEVICE AND STORAGE MEDIUM

BACKGROUND

Technical Field

Embodiments of the present disclosure generally relate to technical fields of computer and data processing and more specifically, to autonomous driving, electronic maps, deep learning, image processing, and the like.

Description of the Related Art

Localization is a fundamental task in a self-driving system of a vehicle and a localization model or localization system is a basic module in the self-driving system. Precise localization of a vehicle is not only an input required by a path planning module of the self-driving system, but can also be applied to a scene interpretation and classification algorithm for simplifying an environment perception module. To exploit high definition (HD) maps as priors for robust environment perception and safe motion planning, the localization system for a vehicle is typically required to reach centimeter-level accuracy.

BRIEF SUMMARY

The present disclosure provides a technical solution for data processing, more specifically a data processing method, a data processing apparatus, an electronic device and a computer-readable storage medium.

According to a first aspect of the present disclosure, there is provided a data processing method. The method comprises inputting a reference image and a captured image into a feature extraction model, respectively, to obtain a first descriptor map and a second descriptor map. The captured image is obtained by capturing an external environment from a vehicle when the vehicle is in a real pose, the reference image being obtained by pre-capturing the external environment by a capturing device. The method also includes obtaining, based on the first descriptor map, a set of reference descriptors corresponding to a set of keypoints in the reference image. In addition, the method contains determining a plurality of sets of training descriptors corresponding to a set of spatial coordinates when the vehicle is in a plurality of training poses, respectively. The plurality of sets of training descriptors belongs to the second descriptor map. The set of spatial coordinates is determined based on the set of keypoints. The plurality of training poses is obtained by offsetting a known pose based on the real pose. The method further covers: obtaining a predicted pose of the vehicle by inputting the plurality of training poses and a plurality of similarities into a pose prediction model. The plurality of similarities is between the plurality of sets of training descriptors and the set of reference descriptors. Moreover, the method comprises training the feature extraction model and the pose prediction model based on a metric representing a difference between the predicted pose and the real pose, in order to apply the trained feature extraction model and the trained pose prediction model to vehicle localization.

According to a second aspect of the present disclosure, there is provided an electronic device. The electronic device comprises at least one processor and at least one memory coupled to the at least one processor. The memory stores instructions executable by the at least one processor and the instructions when executed by the at least one process cause the electronic device to: input a reference image and a captured image into a feature extraction model, respectively, to obtain a first descriptor map and a second descriptor map. The captured image is obtained by capturing an external environment from a vehicle when the vehicle is in a real pose. The reference image is obtained by pre-capturing the external environment by a capturing device. The instructions when executed by the at least one processor cause the electronic device to: obtain, based on the first descriptor map, a set of reference descriptors corresponding to a set of keypoints in the reference image. The instructions when executed by the at least one processor cause the electronic device to: determine a plurality of sets of training descriptors corresponding to a set of spatial coordinates when the vehicle is in a plurality of training poses, respectively. The plurality of sets of training descriptors belongs to the second descriptor map. The set of spatial coordinates is determined based on the set of keypoints. The plurality of training poses is obtained by offsetting a known pose based on the real pose. The instructions when executed by the at least one processor cause the electronic device to: obtain a predicted pose of the vehicle by inputting the plurality of training poses and a plurality of similarities into a pose prediction model. The plurality of similarities is between the plurality of sets of training descriptors and the set of reference descriptors. The instructions when executed by the at least one processor cause the electronic device to: train the feature extraction model and the pose prediction model based on a metric representing a difference between the predicted pose and the real pose, in order to apply the trained feature extraction model and the trained pose prediction model to vehicle localization.

According to a third aspect of the present disclosure, there is provided a non-transitory computer-readable storage medium with computer instructions stored thereon, the computer instructions, when executed in a device, causing the device to perform a method according to the first aspect of the present disclosure.

When applied to a vehicle localization system, the trained feature extraction model and pose prediction model according to some embodiments of the present disclosure can improve accuracy and robustness of vehicle localization, thereby boosting the performance of the vehicle localization system.

It should be appreciated that this Summary is not intended to identify key features or essential features of the example embodiments of the present disclosure, nor is it intended to be used to limit the scope of the disclosure. Other features of the present disclosure will be made apparent by the following description.

BRIEF DESCRIPTION OF THE SEVERAL VIEWS OF THE DRAWINGS

Through the following detailed description with reference to the accompanying drawings, the above and other objectives, features, and advantages of example embodiments of the present disclosure will become more apparent. Several example embodiments of the present disclosure will be illustrated in the drawings by way of example, without limitation. Therefore, it should be appreciated that the drawings are provided for better understanding on the technical solution of the present disclosure and thus do not constitute limitations to the present disclosure.

Throughout the drawings, the same or similar reference symbols refer to the same or similar elements.

DETAILED DESCRIPTION

Figure 1:
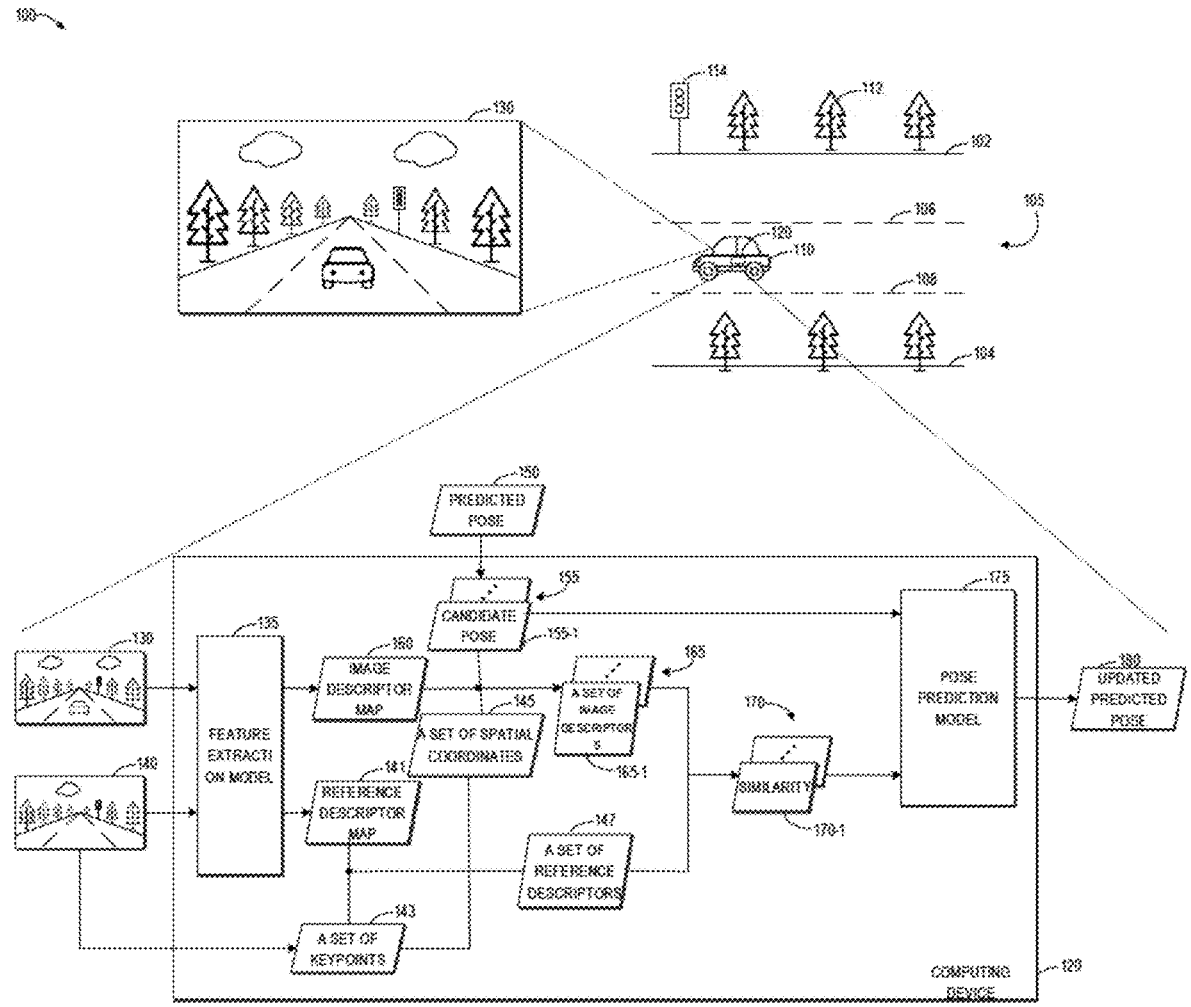
FIG. 1 illustrates a schematic diagram of an example environment in which some embodiments of the present disclosure can be implemented.

Example embodiments of the present disclosure will now be described, covering various details of those embodiments for better understanding, which should be considered as being provided exemplarily. Thus, it should be appreciated by those skilled in the art that various changes and modifications to the embodiments described herein are allowed, without departing from the scope and spirit of the present disclosure. Moreover, for clarity and brevity, description on functionalities and structures well known in the art will be omitted herein.

As aforementioned, localization is a fundamental task in a self-driving system of a vehicle. To exploit high definition (HD) maps as priors for robust perception and safe motion planning, the localization system for autonomous driving is required to reach centimeter-level accuracy. Despite many decades of research, building a long-term, precise and reliable localization system using low-cost sensors, such as an automotive and consumer-grade global positional system (GPS), internal measurement unit (IMU) and cameras, is still an open-ended and challenging problem.

Conventional solutions for visual localization of a vehicle are mainly divided into two categories. One category of conventional solutions performs vehicle localization by matching local keypoints of a high precision map with respective keypoints in the real-time (also referred to as "online") image captured by the vehicle. In other words, this category of conventional solutions leverages a routine method or machine learning-based method for extracting keypoints from a high precision map, so as to build a sparse keypoint map. When performing online vehicle localization, a pose of the vehicle is computed by determining a "three-dimensional and two-dimensional (3D-2D)" corresponding relation between keypoints in the sparse keypoint map and the online image captured by the vehicle.

The other category of conventional solutions achieves vehicle localization using human-made objects, which encodes specific appearances and semantic meanings in an environment or scene, such as lane markings, road signs, road curbs, poles, and the like. Those features are typically considered relatively stable and can be easily recognized as they are built by humans for specific purposes and also used by human drivers to aid their driving behavior. Based on this idea, in this category of conventional solutions, various human-made elements, such as lane markings, poles, and the like, are used for localization. More specifically, types of the artificial elements for localization may be predetermined by humans and stored in a high precision map. When performing online vehicle localization, the artificial elements in the high precision map may be compared with the artificial elements detected by a vehicle online in real time, so as to obtain a localization pose of the vehicle.

In the category of conventional solutions, training of a machine learning model for vehicle localization is related to localization technical solutions used therein. More specifically, in the conventional solutions using artificial elements (e.g., lane markings, poles, and the like) for localization, it is required to manually mark localization elements in a map to train a machine learning model for detecting localization elements. In comparison, in the other category of conventional solutions using local keypoint matching for localization, if conventional features are utilized, training is not required; and if machine learning-based features are employed, training is performed through a matching relationship of local blocks between images. Nonetheless, in both categories of the conventional solutions, vehicle localization results obtained by the vehicle localization system including a machine learning model are not used directly as loss functions for training the machine learning model therein, leading to an unsatisfactory localization accuracy of the vehicle localization system. In those conventional solutions for localization based on artificial elements, given the fact that the localization elements are defined and marked manually, considerable labor costs are incurred.

In view of the foregoing research and analysis, embodiments of the present disclosure provide a technical solution for performing vehicle localization based on a machine learning model and a technical solution for training the machine learning model. To be more specific, embodiments of the present disclosure provide a data processing method, data processing apparatus, electronic device and computer storage medium to at least partly solve the above technical problems and other potential technical problems in the conventional solutions.

In embodiments of the present disclosure, first of all, there is provided a technical solution for performing vehicle localization based on a machine learning model. Vehicle localization used herein refers to determining a position and a posture of a vehicle, which are collectively referred to as pose. In the technical solution for vehicle localization, a computing device (or other computing device) of a vehicle may obtain an image (also referred to as captured image herein) of an external environment captured by a capturing device of the vehicle and a predicted pose when the vehicle is capturing the image. The accuracy of the predicted pose may be less than a predetermined threshold and thus cannot be applied to applications (e.g., autonomous driving) requiring high accuracy localization. Then, the computing device may update the predicted pose of the vehicle based on the captured image and a reference image of the external environment, so as to ultimately obtain a predicted pose with accuracy greater than the predetermined threshold, for use in applications requiring high accuracy localization.

Accordingly, in order to update the predicted pose of the vehicle, the computing device may also obtain reference images by capturing an external environment by a capturing device (e.g., a high precision map capture vehicle, and the like), in addition to the captured image. Subsequently, the computing device may input the reference image and the captured image into a trained feature extraction model, respectively, to obtain a reference descriptor map and an image descriptor map. In the context of the present disclosure, a descriptor map (also referred to as description sub-map) of an image may refer to a map formed by descriptors corresponding to respective image points in the image. That is to say, at a position corresponding to a certain image point (e.g., a pixel) of the image, it is a descriptor of the image point that is recorded in the descriptor map.

During pre-capturing the external environment by the capturing device, spatial coordinate information associated with the reference image may also be captured. As such, the computing device may obtain spatial coordinates corresponding to image points in the reference image, for example, three-dimensional spatial coordinates. In this circumstance, the computing device may select, from all image points in the reference image, a set of keypoints for aiding vehicle localization and may further obtain a set of spatial coordinates corresponding to the set of keypoints, including spatial coordinates corresponding to respective keypoints in the set of keypoints. In addition, based on the reference descriptor map, the computing device may also obtain a set of reference descriptors corresponding to the set of keypoints, which includes reference descriptors corresponding to respective keypoints in the set of keypoints.

As indicated above, the predicted pose of the vehicle obtained by the computing device is not a real pose of the vehicle, but instead approaches the real pose of the vehicle to a certain extent. In other words, the real pose of the vehicle may be considered "neighboring" the predicted pose. In light of the idea, in the embodiments of the present disclosure, the computing device may obtain a plurality of "candidate poses" of the real pose of the vehicle by offsetting the predicted pose. The computing device then may determine an updated predicted pose of the vehicle based on the plurality of candidate poses.

To this end, for a certain candidate pose in the plurality of candidate poses, the computing device may assume that it is the real pose of the vehicle. Under this assumption, in the image descriptor map of the captured image, the computing device may determine a set of image descriptors corresponding to the set of spatial coordinates, which includes image descriptors corresponding to respective keypoints in the set of keypoints. As there is a plurality of candidate poses, the computing device may determine a plurality of sets of image descriptors respectively corresponding to a plurality of candidate poses in the same manner. Thereafter, the computing device may determine a plurality of similarities between the plurality of sets of image descriptors and the set of reference descriptors and input the plurality of candidate poses and the respective plurality of similarities into the trained pose prediction model to update the predicted pose of the vehicle.

It is worth noting that, in the localization system for locating a vehicle according to embodiments of the present disclosure, the feature extraction model and the pose prediction model used herein may be a machine learning model trained using training data. To enable the vehicle localization system according to embodiments of the present disclosure to achieve highly accurate, robust vehicle localization, embodiments of the present disclosure provide a technical solution for training a feature extraction model and a pose prediction model. To be specific, the training process of the feature extraction model and the pose prediction model may be similar to the vehicle localization process as summarized above. The difference is that a real pose when a vehicle is capturing an image is known during a model training process. In order to train the above-mentioned model, the input to the vehicle localization system is a known pose based on the real pose of the vehicle, rather than a predicted pose of the vehicle. In some embodiments, there is a known offset between the known pose and the real pose of the vehicle. In some embodiments, the known pose may be a real pose of the vehicle. Similar to the vehicle localization process, the computing device obtains a plurality of training poses from the offsets of a known pose. After obtaining, based on the plurality of training poses, a predicted pose of the vehicle using the feature extraction model and the pose prediction model, the computing device may train the feature extraction model and the pose prediction model using a metric of a difference between the predicted pose and the real pose of the vehicle, thereby achieving an end-to-end model training solution.

Moreover, it should be further pointed out that a captured image captured by the imaging device of a vehicle, the reference image captured by the capturing device, and other related data can be applied not only to the vehicle localization process but also to the training process of the feature extraction model and the pose prediction model. In other words, during the vehicle localization process and the model training process, the same method is employed for obtaining the captured image, the reference image, and other related data. Accordingly, in the description of the present disclosure, data (e.g., the captured image, the reference image, and the like) used in the vehicle localization process, and data (e.g., the captured image, the reference image, and the like) involved in the model training process will not be differentiated herein in terminology. However, it should be appreciated that the captured images involved in the vehicle localization process and the model training process may be different while the reference image and related data involved in the aforesaid two processes may be the same. From the description of the present disclosure, it can be understood whether the data used herein, including the captured image, the reference image, and the like, are applied in a vehicle locational process or a model training process.

The technical solution of the present disclosure provides a novel visual localization framework, for example, for autonomous driving, which rely on neither artificial elements in a map (e.g., a high precision map) for localization nor a selection of local keypoints in the map, thereby avoiding inherent deficiencies and problems in the two categories of the conventional solutions. Furthermore, the technical solution for vehicle localization according to embodiments of the present disclosure can significantly improve the localization accuracy and robustness of vehicle localization, for example, achieving centimeter level accuracy under various challenging lighting conditions.

On the other hand, the technical solution of the present disclosure provides an end-to-end training mechanism for training a feature extraction model and a pose prediction model in a vehicle localization system, which may be based on deep learning, for example. Parameters of models required by both the feature extraction model and the pose prediction model can be trained efficiently based on the training mechanism. Accordingly, the trained feature extraction model and pose prediction model according to some embodiments of the present disclosure can significantly boost the localization accuracy and robustness of the vehicle localization system. Some example embodiments of the present disclosure will be described below with reference to the drawings.

Example Environment

FIG. 1 illustrates a schematic diagram of an example environment 100 in which some embodiments of the present disclosure can be implemented. As shown in FIG. 1, the example environment 100 may include a vehicle 100 and an external environment 105 with respect to the vehicle 110. For example, the vehicle 110 is probably driving on a road defined by road boundaries 102 and 104. In some embodiments, the vehicle may be in a parked state, rather than in a driving state, for example, due to an indication of a traffic light or traffic jam. More typically, without defining therein a particular movement state of the vehicle 110, the embodiments of the present disclosure are equally applicable to the vehicle 110 at any movement state. In some embodiments, the vehicle 110 may be an automated guided vehicle (AGV). In some other embodiments, the vehicle 110 may be a manned vehicle which has an autonomous driving function to assist the driver in driving. In other embodiments, the vehicle 110 may be an ordinary vehicle without the autonomous driving function.

As shown in FIG. 1, the example road is also divided by lane markings 106 and 108 into three lanes, and the vehicle 110 is depicted as traveling in the middle lane. However, it should be appreciated that such depiction is provided merely as an example, and embodiments of the present disclosure are equally applicable to the situation where the vehicle 110 is at any available position, rather than restricting the vehicle 110 to a particular position. In the example of FIG. 1, in addition to the road boundaries 102 and 104, vegetation is also provided, such as trees 112 and the like. Moreover, traffic support facilities, such as a traffic light 114 and the like, are also provided outside the road boundary 102. It should be appreciated that the trees 112 and the traffic light 114 depicted in FIG. 1 are provided merely as an example, without suggesting any limitation to the scope of the present disclosure, and the embodiments of the present disclosure are equally applicable to a road environment including any object or facility, or a non-road environment.

In the context of the present disclosure, the external environment 105 of the vehicle 110 may include or cover all objects, targets or elements outside the vehicle 110. For example, the external environment 105 may include road boundaries 102 and 104, lane markings 106 and 108, trees 112, a traffic light 114, and the like, as shown in FIG. 1. In another example, the external environment 105 may also include other transportation means, pedestrians and other objects in traffic, for example, other vehicles traveling on the road and the like. For a further example, the external environment 105 may include the sun, the moon, stars, clouds, aircrafts, flying animals, and the like.

In some embodiments, the vehicle 110 may capture a captured image 130 of the external environment 105 via an imaging device (not shown) and provide it to a computing device 120 of the vehicle 110. It is worth noting that the imaging device used herein may be an imaging device fixedly mounted on the vehicle 110, an imaging device handheld by a passenger within the vehicle 110, an imaging device outside the vehicle 110, and the like. The embodiments of the present disclosure do not restrict the specific positional relation between the imaging device and the vehicle 110. For the purpose of illustration, the imaging device for capturing the external environment 105 of the vehicle 110 will be referred to as imaging device of the vehicle 110 below. However, it should be appreciated that the embodiments of the present disclosure are equally applicable to a situation where the imaging device is not fixedly mounted on the vehicle 110.

Typically, the imaging device of the vehicle 110 may be any device having an imaging function. Such imaging device includes, but is not limited to, a camera, a video camera, a camera, a driving recorder, a surveillance probe, a movable device having an image capturing or video recording function, and the like. For example, in the example of FIG. 1, the captured image 130 captured by the imaging device of the vehicle 110 includes road boundaries, lane markings, trees, a traffic light, a vehicle in front of the vehicle 110, clouds in the sky, and other objects. It should be understood that various objects presented in the captured image 130 depicted in FIG. 1 are provided merely as an example, without suggesting any limitation to the scope of the present disclosure. The embodiments of the present disclosure are equally applicable to a situation where the captured image 130 includes any possible object.

In addition to obtaining the captured image 130, the computer device 120 may also obtain a predicted pose 150 of the vehicle 110 when capturing the captured image 130. As used herein, the pose of the vehicle 110 may refer to a position and a posture of the vehicle 110. In some embodiments, the pose of the vehicle 110 may be represented by six degrees of freedom (DoF). For example, the position of the vehicle 110 may be represented by a horizontal axis (i.e., x coordinate), a longitudinal axis (i.e., y coordinate) and a vertical coordinate (i.e., z coordinate) while the posture of the vehicle 110 may be represented by a pitch angle relative to a horizontal axis (i.e., x axis), a yaw angle relative to a longitudinal axis (i.e., y axis) and a roll angle relative to a vertical axis (i.e., z axis). It should be appreciated that the pose of the vehicle 110 represented by a horizontal axis, a longitudinal axis and a vertical coordinate, a pitch angle, a yaw angle and a roll angle is provided only as an example, and the embodiments of the present disclosure are equally applicable to a situation where a position of a vehicle 110 is represented by the coordinate of latitude and longitude and altitude coordinates, and the pitch angle, the yaw angle and the roll angle may also be described in other equivalent manners.

In some circumstances, measuring some of the six degrees of freedom may be implemented through some known, well-developed methods. For example, the ordinate, the pitch angle and the roll angle of the vehicle 110 on the road may be estimated or determined in practice in a simpler way. For example, since gravity is not negligible and cannot be overlooked, and a customer-grade inertial measurement unit (IMU) is good enough to estimate the roll angle and the pitch angle accurately. In another example, after the vehicle 110 is successfully located horizontally, the latitude of the vehicle 110 may be estimated or determined by reading a digital elevation model (DEM) map. Therefore, in some implementations, the embodiments of the present disclosure may focus only on three degrees of freedom (i.e., the horizontal axis, the longitudinal axis and the yaw angle axis) in the pose of the vehicle 110. Of course, it should be appreciated that, the embodiments of the present disclosure may be equally applicable to a determination of all six degrees of freedom in the pose of the vehicle 110, or may be equally applicable to a determination of more or fewer degrees of freedom in the pose of the vehicle 110.

In the context of the present disclosure, the pose of the vehicle 110 and the pose of the imaging device of the vehicle 110 may be regarded as having a fixed conversion relation, that is, the two may be deduced from each other based on the conversion relation. The specific conversion relation may be dependent on how the imaging device is provided on or in the vehicle 110. As a result, although the pose of the imaging device determines in which direction and angle the captured image 130 is captured and impacts an image feature in the captured image 130, the captured image 130 may be used to determine the pose of the vehicle 110 due to the fixed conversion relation. Accordingly, throughout this context, the pose of the vehicle 110 and the pose of the imaging device are not substantively distinguished unless otherwise indicated, and the two are considered to be consistent in meaning in the embodiments of the present disclosure. For example, when the vehicle 110 is at different poses, the objects presented in the captured image 130 obtained by capturing an external environment 105 from the vehicle 110 are varied. For example, the positions and angles of the respective objects in the captured image 130 may be changed. As such, the image feature of the captured image 130 may reflect the pose of the vehicle 110.

In some embodiments, accuracy of a predicted pose 150 of the vehicle 110 obtained by the computing device 120 may be below a predetermined threshold and thus cannot be used in applications requiring high localization accuracy, for example, autonomous driving of the vehicle 110, and the like. Therefore, the computing device 120 probably needs to update the predicted pose 150, so as to obtain an updated predicted pose 180 with accuracy exceeding the predetermined threshold for use in applications requiring high localization accuracy, for example, the autonomous driving of the vehicle 110, and the like. In some embodiments, the predicted pose 150 of the vehicle 110 may be determined roughly in other localization manners with lower accuracy. Then, the coarse predicted pose may be updated to an accurate predicted pose. In other embodiments, the predicted pose 150 of the vehicle 110 may be obtained through the technical solution of the present disclosure. In other words, the technical solution for vehicle localization according to the embodiments of the present disclosure can be used iteratively to update the predicted pose of the vehicle 110.

In order to update the predicted pose 150, the computing device 120 may obtain a reference image 140 of the external environment 105, in addition to the captured image 130. The reference image 140 may be obtained by pre-capturing the external environment 105 by a capturing device. For example, in some embodiments, the capturing device may be a capture vehicle for depicting a high precision map. In other embodiments, the capturing device may be any other mapping device for capturing data of a road environment. It is worth noting that, when the capturing device is obtaining the reference image 140 by capturing the external environment 105, other measurement information associated with the reference image 140 may be captured as well, for example, spatial coordinate information corresponding to image points in the reference image 140.

In the context of the present disclosure, a high precision map typically refers to an electronic map having highly accurate data. For example, the high accuracy used herein refers to that the accuracy of absolute coordinate of the high definition electronic map is high, on one hand. The accuracy of the absolute coordinate refers to accuracy between a certain target on the map and a corresponding real object in the outside world. On the other hand, road traffic information elements contained in the high precision map are richer and more detailed. As another example, absolute accuracy of a high precision map is generally at the sub-meter level, that is, it has accuracy within one meter, and relative accuracy in the horizontal direction (e.g., relative position accuracy between lanes or between a lane and a lane marking) is often much higher. In addition, in some embodiments, a high precision map includes not only highly accurate coordinates but also a precise shape of road, and also contains the slope, curvature, heading and elevation and inclination data of each lane. In some embodiments, a high precision map can depict not only a road but also the number of lanes on the road, so as to truly reflect the actual road condition.

As shown in FIG. 1, in some embodiments, the computing device 120 may update the predicted pose 150 by processing the captured image 130, the reference image 140 and the predicted pose 150, so as to obtain an updated predicted pose 180. For example, the accuracy of the updated predicted pose 180 may exceed a predetermined threshold such that it can be used in an application requiring high localization accuracy for the vehicle 110, such as autonomous driving, and the like. More specifically, the computing device 120 may input the captured image 130 and the reference image 140 of the external environment 105 into a trained feature extraction model 130, respectively, to obtain an image descriptor map 160 and a reference descriptor map 141. Moreover, the computing device 120 may obtain a set of keypoints 143 in the reference image 140. Thereafter, the computer device 120 may obtain, based on the reference descriptor map 141, a set of reference descriptors 147 corresponding to the set of keypoints 143. In addition, the computing device 120 may obtain a set of spatial coordinates 145 corresponding to the set of keypoints 143. The computing device 120 then may derive, from an offset from the predicted pose 150, a plurality of candidate poses 155 of a real pose of the vehicle 110, for example, including the first candidate pose 155-1.

Figure 2:
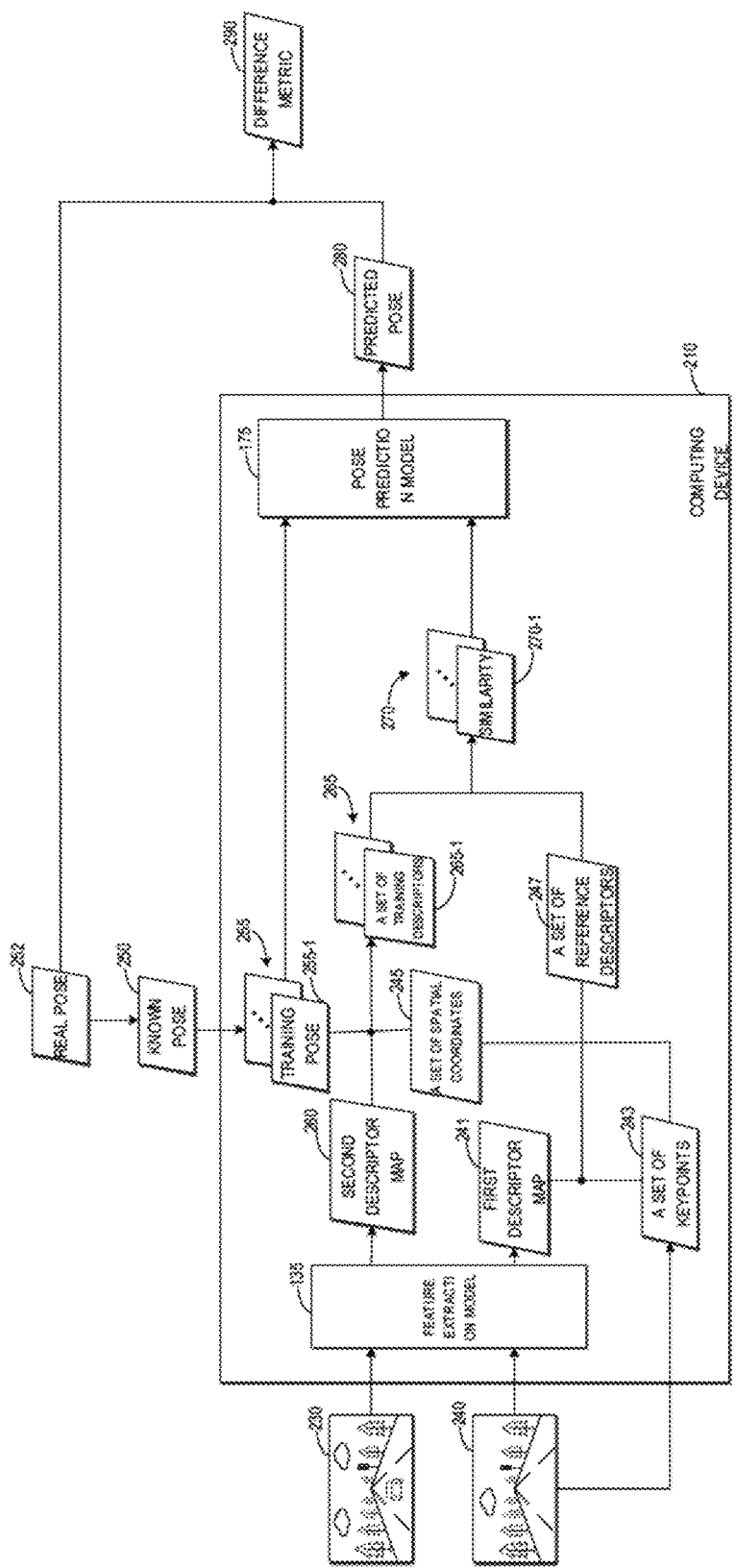
FIG. 2 illustrates a schematic diagram of training a feature extraction model and a pose prediction model according to some embodiments of the present disclosure.
Figure 3:
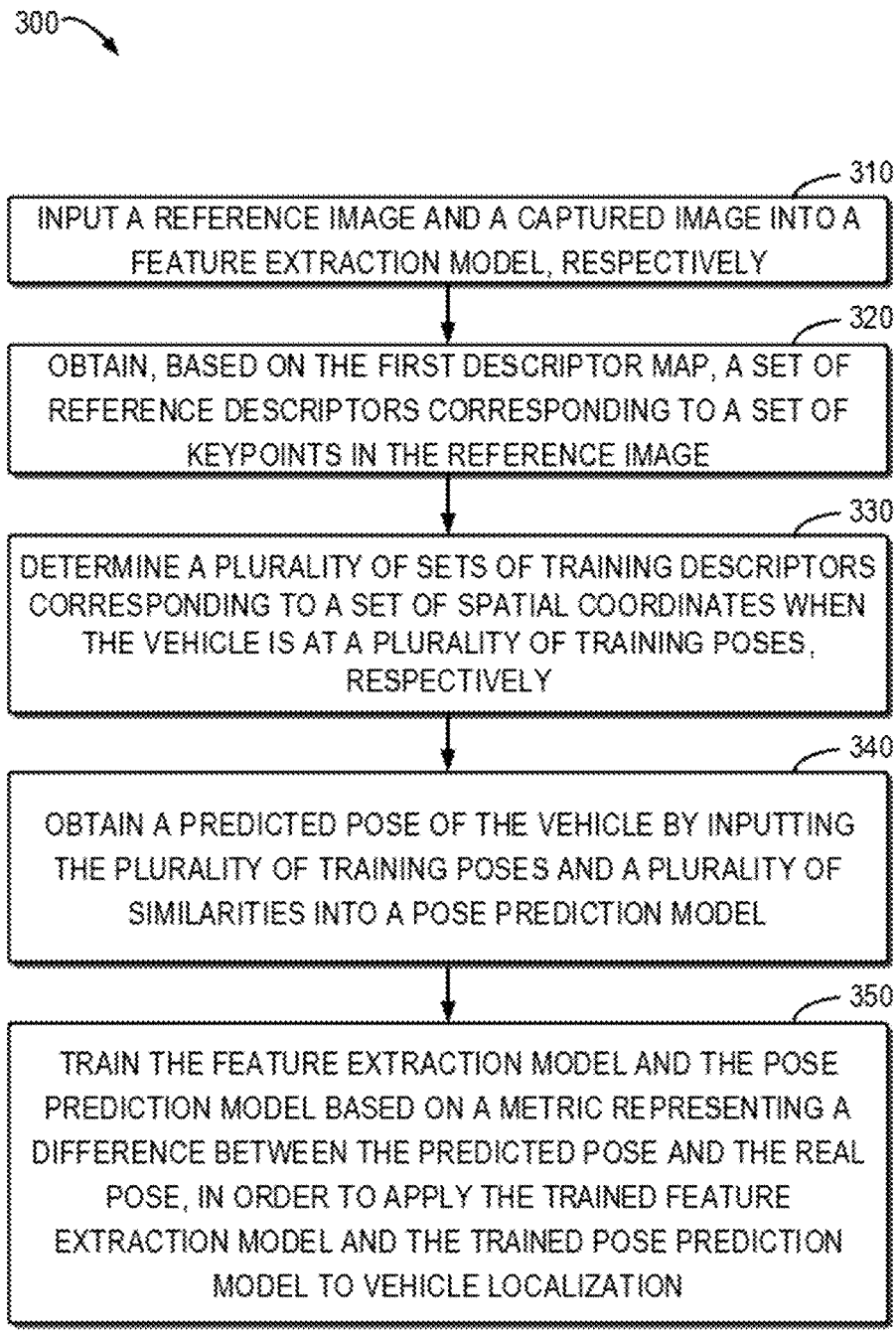
FIG. 3 illustrates a flowchart of an example process of data processing according to some embodiments of the present disclosure.

Subsequently, the computing device 120 may determine a plurality of sets of image descriptors 165 corresponding to the set of spatial coordinates 144 in the image descriptor map 160 when the vehicle 110 is at a plurality of candidate poses 155, respectively. For example, a set of image descriptors 165-1 may be a set of image descriptors corresponding to the set of spatial coordinates 145 in the image descriptor map 160 when the vehicle 110 is in the first candidate pose 155-1. Then, the computing device 120 may determine a plurality of similarities 170 between the plurality of sets of image descriptors 165 and the set of reference descriptors 147. For example, a similarity 170-1 may be a similarity between the set of image descriptors 165-1 and the set of reference descriptors 147. Thereafter, the computing device 120 may obtain the updated predicted pose 180 of the vehicle 110 by inputting the plurality of candidate poses 155 and the plurality of similarities 170 into a trained pose prediction model 175. Consequently, in the sense of obtaining an updated predicted pose 180 of the vehicle 110, the pose prediction model 175 may also be referred to as pose updating model 175. It should be appreciated that other details of the localization process of the vehicle 110 may be determined with reference to relevant details of the training process of the feature extraction model 135 and the pose prediction model 175. Reference will be made to FIGS. 2 and 3 below to describe in detail the training process of the feature extraction model 135 and the pose prediction model 175.

It is worth noting that, although described with the example environment 100 including the vehicle 110 in FIG. 1, the embodiments of the present disclosure are not limited to vehicle localization. To be more general, the embodiments of the present disclosure may be equivalently applicable to any device or tool for localization, such as means of transportation, an unmanned aerial vehicle, an industrial robot, and the like. The means of transportation used herein refers to any movable tool that can carry people and/or objects. For example, the vehicle 110 in FIG. 1 may be a motorized or non-motorized vehicle, including, but is not limited to, a car, sedan, truck, bus, electric vehicle, bicycle, and the like. However, it should be appreciated that the vehicle 110 is only an example of means of transportation. The embodiments of the present disclosure are equivalently applicable to any other means of transportation, other than a vehicle, such as a ship, train, airplane, and the like.

FIG. 2 illustrates a schematic diagram of training a feature extraction model 135 and a pose prediction model 175 according to some embodiments of the present disclosure. In FIG. 2, the training process of the feature extraction model 35 and the pose prediction model 175 is depicted as being performed by a further computing device 210 different than the computing device 120 of the vehicle 110. In other words, the computer device 210 may train the feature extraction model 135 and the pose prediction model 175 based on training data, and then provides the trained feature extraction model 135 and pose prediction model 175 to the computing device 120 of the vehicle 110 for locating the vehicle 120. In other embodiments, the training process of the feature extraction model 135 and the pose prediction model 175 may be performed by the computing device 120 of the vehicle 110.

As shown in FIG. 2, the training process of the feature extraction model 135 and the pose prediction model 175 is similar to the localization process of the vehicle 110 as described above with reference to FIG. 1. The difference therebetween is that, in the training process depicted in FIG. 2, the real pose 252 of the vehicle 110 when capturing the captured image 230 is known. In order to train the feature extraction model 135 and the pose prediction model 175, the known pose 250 based on the real pose 252 is input into the computing device 210 to obtain a plurality of training poses 255. In some embodiments, the difference between the known pose 250 and the real pose 252 is known, and may be determined based on factors, such as a specific technical environment, accuracy requirement, and the like. In some other embodiments, the known pose 250 may be identical to the real pose 252, that is, the difference between the known pose 250 and the real pose 252 is set to zero. Then, the computing device 210 may process the plurality of training poses 255 in the similar manner for processing "candidate poses 155" as described above, so as to obtain a predicted pose 280. Next, the computing device 210 may train the feature extraction model 135 and the pose prediction model 175 based on a difference metric 290 between the predicted pose 280 and the real pose 252.

In addition, in the training process of FIG. 2, in order to distinguish between the captured image 130 and the reference image 140 for locating the vehicle 110 depicted in FIG. 1, the input to the computing device 210 is the obtained image 230 and the reference image 240 for model training. Nevertheless, it should be appreciated that the distinction between the captured images or reference images in FIGS. 1 and 2 is only in the sense of use or function, without indicating a distinction between the captured images or reference images per se. Consequently, in some embodiments, the captured image 130 and the reference image 140 may be different than the captured image 230 and the reference image 240. In other embodiments, the captured image 130 and the reference image 140 may be identical to the captured image 230 and the reference image 240. Reference will be made to FIG. 3 below to describe in detail an example process of training, by the computing device 210, the feature extraction model 135 and the pose prediction model 175.

In some embodiments, the computing device 120 and the computing device 210 may include any device that can implement a computing function and/or control function, which may be any type of fixed computing device, or movable/portable computing device, including, but is not limited to, a dedicated computer, general-purpose computer, desktop computer, laptop computer, notebook computer, netbook computer, tablet computer, multimedia computer, mobile phone, general-purpose processor, microprocessor, microcontroller, or state machine. The computing device 120 and the computing device 210 may be implemented as an individual computing device or a combination of computing devices, for example, a combination of a digital signal processor (DSP) and a microcontroller, a plurality of microprocessors, a combination of one or more microprocessors and a DSP core, or any other similar configuration.

It should be pointed out that, although the computing device 120 is depicted as being arranged inside the vehicle 110 in FIG. 1, this is only provided as an example, without suggesting any limitation to the scope of the present disclosure. In other embodiments, the computing device 120 may also be arranged at a position away from the vehicle 110. For example, the computing device 120 may be a cloud computing device. In this circumstance, the vehicle 110 may transmit data or information to be processed to a remote computing device 120 via a wireless or wired communication network. Having completed data or information processing, the computing device 120 may transmit a processing result, control command, or the like to the vehicle 110. Moreover, the computing device 120 and the computing device 210 used herein may also be referred to as electronic device 120 and electronic device 210, respectively, and the two terms may be used interchangeably herein.

In addition, it should be appreciated that FIGS. 1 and 2 exemplarily show objects, units, elements, or components related to the embodiments of the present disclosure. In practice, the example environment 100 may also include other objects, or units, elements or components for other functions. Furthermore, the specific number of objects, units, elements, or components shown in FIGS. 1 and 2 is provided merely as an example, without suggesting any limitation to the scope of the present disclosure. In other embodiments, the example environment 100 may include any appropriate number of objects, units, elements, components, or the like. Therefore, instead of being limiting to the specific scenario depicted in FIG. 1, the embodiments of the present disclosure are generally applicable to any technical environment for locating an object (e.g., a vehicle) and training the machine learning model based on a machine learning model. References will be made to FIGS. 3-9 below to describe an example process of training a feature extraction model 135 and a pose prediction model 175 according to some embodiments of the present disclosure.

Example Process of Training Feature Extraction Model and Pose Prediction Model

FIG. 3 illustrates a flowchart of an example process 300 of data processing according to some embodiments of the present disclosure. In some embodiments, the example process 300 may be implemented by the computing device 210 depicted in FIG. 2, for example, a processor or processing unit of the computing device 210, or various functional modules of the computing device 210. In other embodiments, the example process 300 may also be implemented by the computing device 120 in the example environment 100, or other unit or module in the example environment 100. Through the example process 300, the trained feature extraction model 135 and pose prediction model 175 can significantly improve the localization accuracy and robustness of the vehicle localization system according to embodiments of the present disclosure. For ease of illustration, reference will be made to FIGS. 1 and 2 below to describe the example process 300.

At block 310 of the example process 300, the computing device 210 may input the reference image 240 and the captured image 230 for model training into the feature extraction model 135, respectively, to obtain the first descriptor map 241 and the second descriptor map 260. In other words, the feature extraction model 135 may extract the first descriptor map 241 from the reference image 240 and extract the second descriptor map 260 from the captured image 230. Hereinafter, the content of the second descriptor image 260 and processing of the second descriptor map 260 by the computing device 210 will be mainly described (for the content of the first descriptor map 214 or processing thereof, see the related description on the second descriptor map 260). In some embodiments, the feature extraction model 135 may be a deep learning-based machine learning model, which may also be referred to as local feature embedding (LFE) model. Since the feature extraction model 135 may be trained by the computing device 210 using training data, the trained feature extraction model 135 may extract the reference descriptor map 141 and the image descriptor map 160 more suitable for locating the vehicle 110 in the localization process of the vehicle 110 depicted in FIG. 1, thereby improving the localization accuracy and robustness of the vehicle 110.

Figure 4:
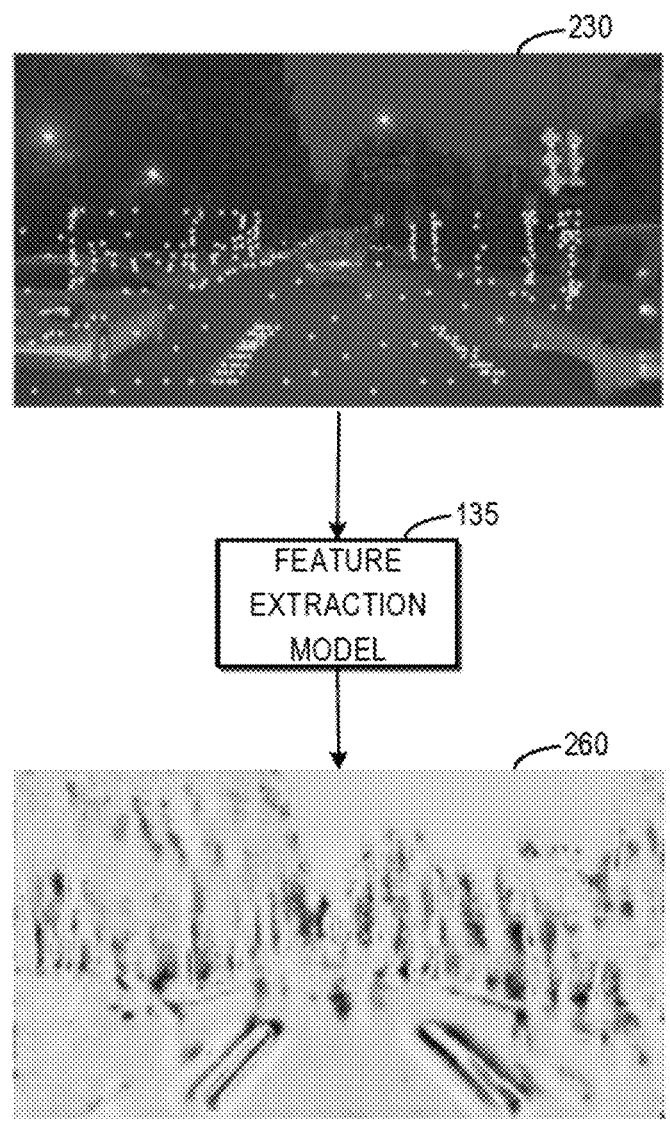
FIG. 4 illustrates an example of obtaining the second descriptor map by inputting a captured image into a feature extraction model, according to some embodiments of the present disclosure.

In some embodiments, the second descriptor map 260 may include descriptors of respective image points in the captured image 230. For example, in the second descriptor map 260, it is a descriptor of a certain image point of the captured image 230 that is recorded at a location corresponding to the image point. In some embodiments, the descriptor of the image point is extracted from an image block where the image point is located (for example, an image block with the image point as the center), and may also be represented by a multi-dimensional vector. For example, descriptors of respective pixels in the captured image 230 may be represented in the form of an 8-dimensional vector, so as to form the second descriptor map 260. The pixels in the captured image 230 are only examples of the image point in the captured image 230. In other embodiments, the image point may also refer to an image unit larger or smaller than the pixel. In addition, it is only an example to represent the descriptor of the image point in the form of an 8-dimensional vector, and the embodiments of the present disclosure are equivalently applicable to a descriptor represented in the form of a vector in any dimension. Reference will be made to FIG. 4 below to explicitly illustrate an example of extracting, by the feature extraction model 135, the second descriptor map 260 from the captured image 230.

FIG. 4 illustrates an example of obtaining the second descriptor map 260 by inputting a captured image 230 into a feature extraction model 135, according to some embodiments of the present disclosure. In FIG. 4, in order to display intuitively, clearly the captured image 230 and the second descriptor map 260, the captured image 230 is represented as an image captured when the vehicle 110 is traveling on a real road while the second descriptor map 260 is a descriptor map presented after visualization processing. As shown in FIG. 4, the captured image 230 may be input into the feature extraction model 135, and the feature extraction model 135 may in turn process the input captured image 230 to extract image features in the captured image 230 and thus generate the second descriptor map 260. Then, the feature extraction model 135 may output the generated second descriptor map 260. As a result, the feature extraction model 135 may be regarded as an image processing model.

Figure 5:
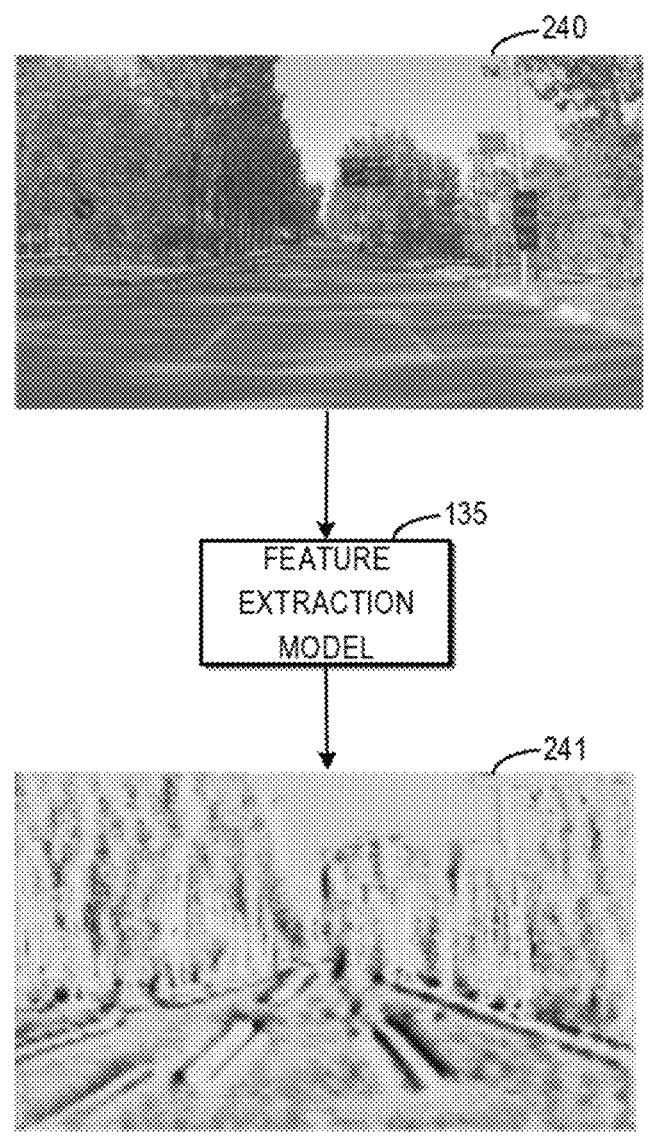
FIG. 5 illustrates an example of obtaining the first descriptor map by inputting a reference image into a feature extraction model, according to some embodiments of the present disclosure.

Similar to FIG. 4, FIG. 5 illustrates an example of obtaining the first descriptor map 241 by inputting a reference image 240 into a feature extraction model 135, according to some embodiments of the present disclosure. In FIG. 5, in order to display intuitively, clearly the reference image 240 and the first descriptor map 241, the reference image 240 is represented as an image captured when a capturing device is capturing data on a real road while the first descriptor map 241 is a descriptor map presented after visualization processing. As shown in FIG. 5, the reference image 240 may be input into the feature extraction model 135, and the feature extraction model 135 may in turn process the input reference image 240 to extract image features in the reference image 240 and thus generate the first descriptor map 240. Thereafter, the feature extraction model 135 may output the generated first descriptor map 241.

Figure 10:
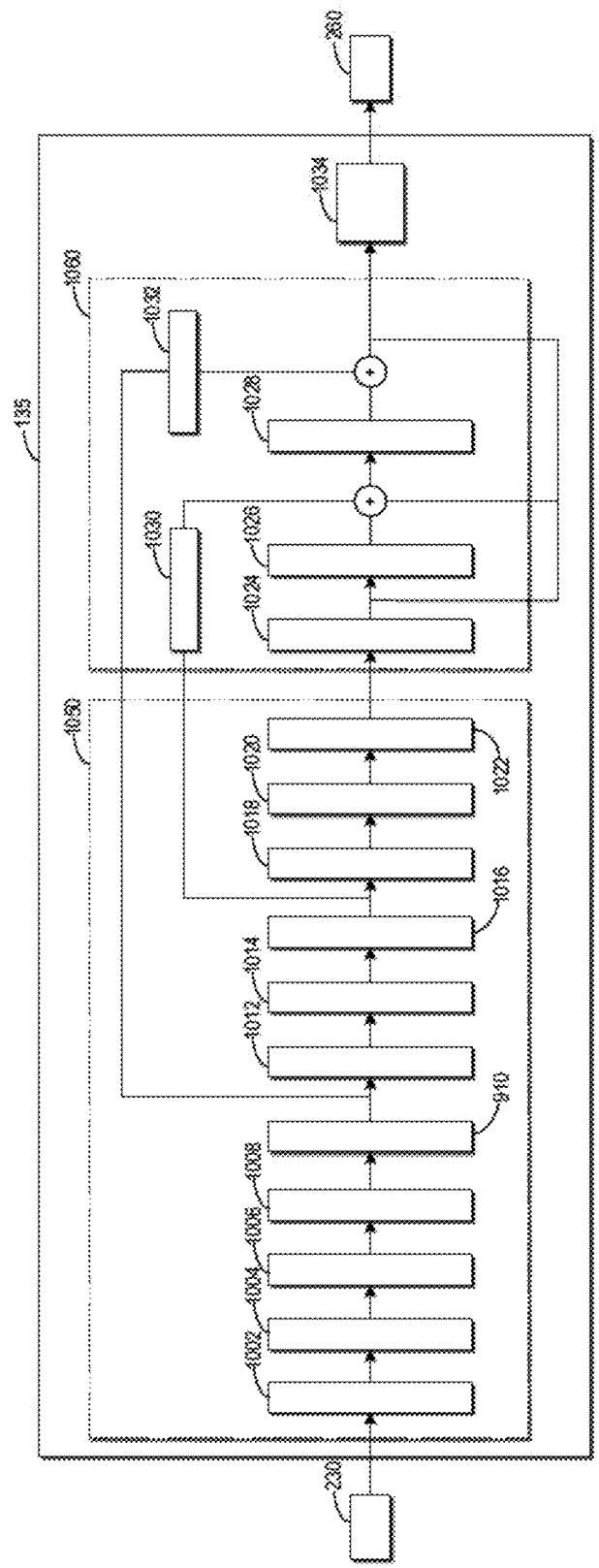
FIG. 10 illustrates an example structure of a feature extraction model according to some embodiments of the present disclosure.

In general, the feature extraction model 135 may be implemented using a convolutional neural network, for example, a deep learning-based convolutional neural network of any appropriate architecture. In some embodiments, considering that the feature extraction model 135 is used for visually locating the vehicle 110, the feature extraction model 135 may be designed to extract good local feature descriptors from the image of the external environment 105, so as to achieve accurate, robust visual localization of the vehicle 110. More specifically, the descriptors extracted by the feature extraction model 135 from the image of the external environment 105 are robust, that is, despite appearance changes caused by varying lighting conditions, or changes in viewpoint, season or the like, feature matching can still be achieved to complete visual localization of the vehicle 110. As such, in some embodiments, the feature extraction model 135 may be implemented using a convolutional neural network based on a feature pyramid network. Reference will be made to FIG. 10 below to describe those embodiments in detail.

Returning to FIG. 3, it is worth noting that the captured image 230 input by the computing device 210 to the feature extraction model 135 at block 310 is obtained by capturing the external environment 105 from the vehicle 110 when the vehicle 110 is in a real pose 252. For example, the real pose 252 of the vehicle 110 may be obtained through a high precision measurement instrument. On the other hand, based on the known pose 250 of the real pose 252, the computing device 210 trains the feature extraction model 135 and the pose prediction model 175. In some embodiments, the difference between the known pose 250 and the real pose 252 is known, and may be determined based on the specific technical environment, accuracy requirement, and the like. In other embodiments, the known pose 250 may be identical to the real pose 252, that is, the difference between the known pose 250 and the real pose 252 is set to zero.

For convenience of description on processing of the known pose by the computing device 210 during model training depicted in FIG. 2, obtaining and processing the predicted pose 150 by the computing device 120 in the localization process of the vehicle 110 in FIG. 1 will be described below appropriately if necessary. It should be appreciated that processing of the known pose 250 by the computing device 120 during model training is the same as or similar to the processing of the predicted pose 150 by the processing device 120 in the localization process of the vehicle 110. As aforementioned, in the localization process of the vehicle 110, the predicted pose 150 obtained by the computing device 120 may be a located pose with accuracy below a predetermine threshold. For example, the predicted pose 150 may not be applied to scenarios requiring high localization accuracy, such as autonomous driving of the vehicle 110, and the like. Consequently, the computing device 120 may update the predicted pose 150 based on the captured image 130 and the reference image 140, so as to obtain an updated predicted pose 180 with accuracy exceeding the predetermined threshold for use in scenarios requiring high localization accuracy.

In some embodiments, the predicted pose 150 may be the updated predicted pose 150 obtained after the computing device 120 previously updated the predicted pose of the vehicle 110 using the localization process depicted in FIG. 1. Then, the computing device 120 may use the localization process depicted in FIG. 1 again to further update the predicted pose 150. In other words, the computing device 120 may use iteratively the localization process depicted in FIG. 1 to update the predicted pose of the vehicle 110, making it possible to gradually approach the real pose of the vehicle 100 from a coarse predicted pose of the vehicle 110, thus obtaining the more accurate predicted pose of the vehicle 110 with localization accuracy below the predetermined threshold.

In other embodiments, the predicted pose 150 may also be obtained by the computing device 120 using other measurement means. For example, the computing device 120 may obtain an incremental motion estimation of the vehicle 110 from an IMU sensor and then add it to a localization result obtained based on the preceding frame of the captured image 130, so as to estimate a predicted pose 150 when the vehicle 110 is capturing the captured image 130. As another example, at the initial stage of the localization process depicted in FIG. 1, the computing device 120 may obtain the predicted pose 150 of the vehicle 110 using a GPS positioning technology (outdoors), other image retrieval technology or Wi-Fi fingerprint identification technology (indoors), and the like. In some other embodiments, the computing device 120 may obtain the predicted pose 150 of the vehicle 110 in any other appropriate manners when capturing the captured image 130.

It should be pointed out that the reference image 240 input by the computing device 210 into the feature extraction model 135 at block 210 is obtained by pre-capturing the external environment 105 by the capturing device. As a result, the reference image 240 may be used for feature matching with the captured image 230 captured by the vehicle 110, so as to determine the predicted pose of the vehicle 110 and then used for training the feature extraction model 135 and the pose prediction model 175. More specifically, in a certain period before the vehicle 110 captures the captured image 230 of the external environment 105 via an imaging device, the capturing device may capture the reference image 240 of the external environment 105. For example, the capturing device may capture the reference image 240 of the external environment 105 to produce a high precision map of the external environment 105. During capturing, the capture vehicle may travel in an area including the external environment 105 and capture a video or a set of images (including the reference image 240 of the external environment 105) of this area during traveling.

In the circumstance where the capturing device pre-capturing the set of reference images about the external environment 105 (e.g., a video or a series of reference images), the computing device 210 probably needs to determine the reference image 240 corresponding to the captured image 230 from the set of reference images, that is to find the reference image in the reference image collection 240. For example, the computing device 210 may directly compare the captured image 230 with each of the set of reference images and then select a reference image closest to the captured image 230 in the set of reference images as the reference image 240. In another example, when capturing the set of reference images, the capturing device probably records a pose of the capturing device when capturing each reference image. In this circumstance, the computing device 210 may select a reference image whose capturing pose of the capturing device is closest to the known pose 250 from the set of reference images as a reference image 240. Of course, it is provided only as an example that the computing device 210 selects the reference image closest to the captured image 230, or a reference image closest to the captured image in capturing pose, as the reference image 240. In other embodiments, the computing device 210 may select a reference image closest to the captured image 230 in image per se or capturing pose as a reference image 240. For example, the difference therebetween is below a predetermined threshold, and so on. More generally, the computing device 210 may obtain a reference image 240 corresponding to the captured image 230 in any other appropriate manner.

Figure 11:
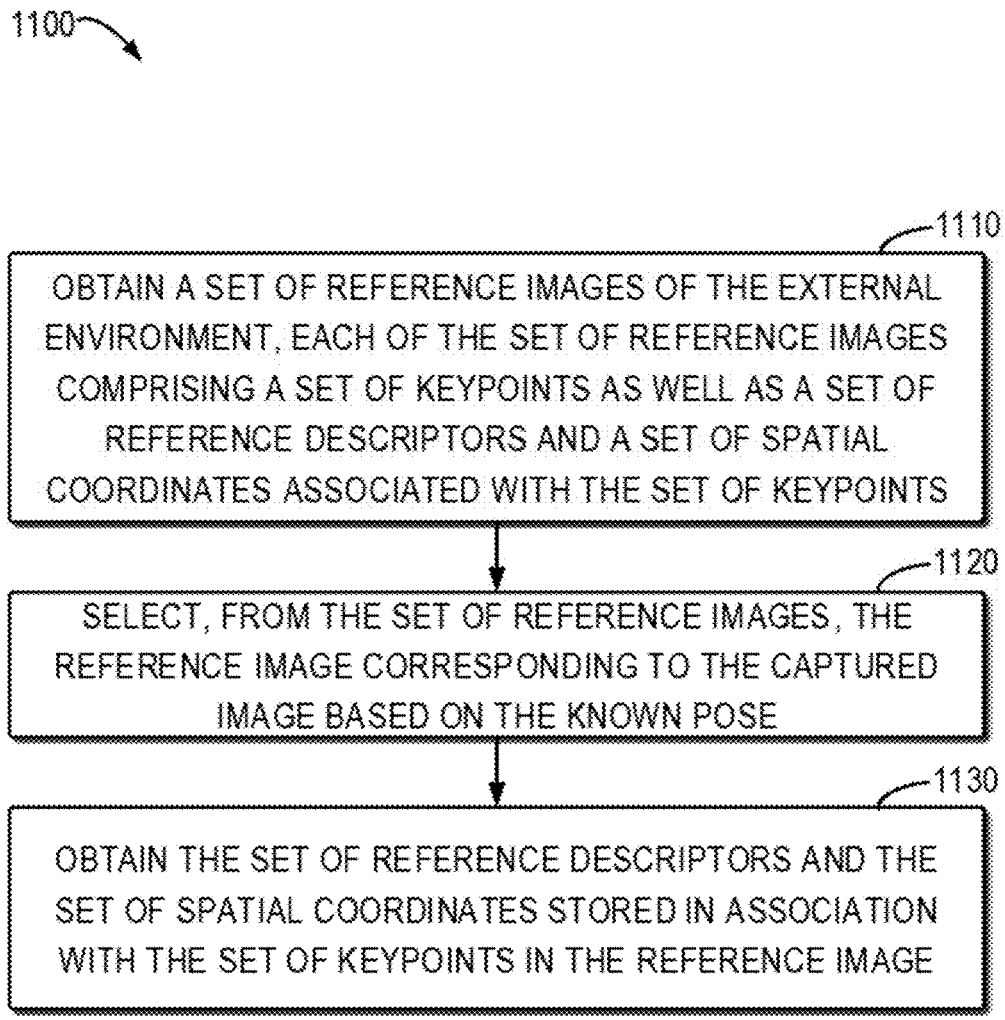
FIG. 11 illustrates a flowchart of an example process of obtaining a set of reference descriptors and a set of space coordinates corresponding to a set of keypoints, according to some embodiments of the present disclosure.
Figure 12:
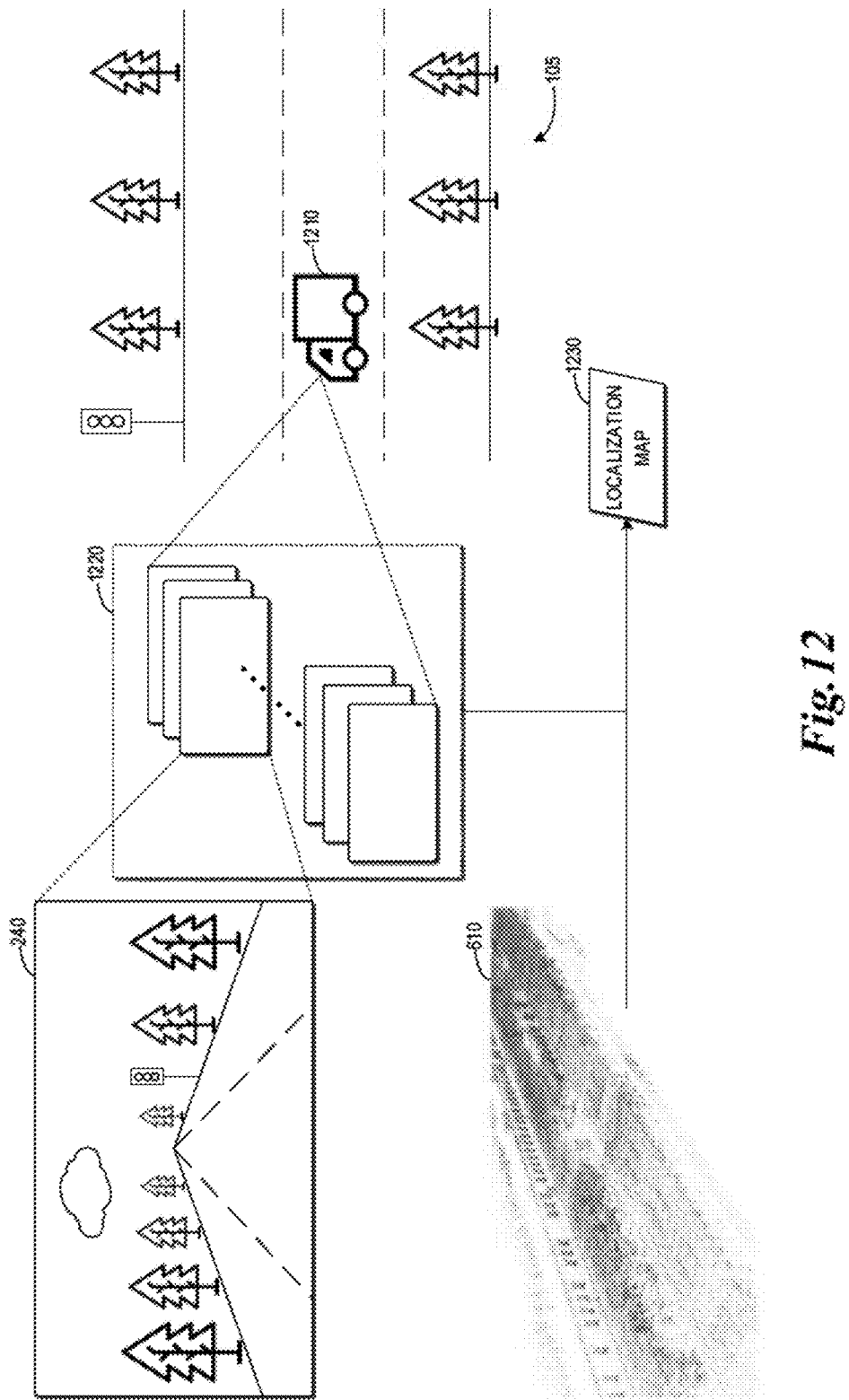
FIG. 12 illustrates a schematic diagram of capturing, by a capture vehicle, a set of reference images of an external environment and generating a localization map according to some embodiments of the present disclosure.

After obtaining, at block 310, the first descriptor map 241 of the reference image 240, the computing device 210 may obtain, based on the first descriptor map 241, a set of keypoints 243 in the reference image 240 corresponding to a set of reference descriptors 247 at block 320. In some embodiments, the computing device 210 or other entity (e.g., other computing device) may have generated and stored associatively a set of keypoints, a set of reference descriptors and a set of spatial coordinates for each of the set of reference images of the external environment 105. In the context of the present disclosure, image data including such data or information may also be referred to as localization map. In this circumstance, using the reference image 240 as an index, the computing device 210 may retrieve in the localization map the set of keypoints 243, the set of spatial coordinates 245 and the set of reference descriptors 247 corresponding to the reference image 240. Reference will be made to FIGS. 11 and 12 below to describe those embodiments.

In other embodiments, the computing device 210 may not have a pre-stored localization map, or may be unable to obtain the localization map. In this circumstance, the computing device 210 may first extract a set of keypoints 243 from the reference image 240, and then obtain a set of spatial coordinates 245 and a set of reference descriptors 247 associated with the set of keypoints 243. More specifically, the computing device 210 may employ various appropriate keypoint selection algorithms to select a set of keypoints 243 from a set of points in the reference image 240. In some embodiments, to avoid the impact of uneven distribution of the keypoints 243 in the reference image 240 on the subsequent model training effect, the computing device 210 may select a set of keypoints from the set of points of the reference image 240 based on a farthest point sampling (FPS) algorithm, so as to achieve uniform sampling of the set of points of the reference image 240. In order to obtain a set of reference descriptors 247 associated with the set of keypoints 240, the computing device 210 may obtain a plurality of reference descriptors (i.e., the set of reference descriptors 247) corresponding to respective keypoints in the set of keypoints 143 from the first descriptor map 241 of the reference image 240.

Figure 6:
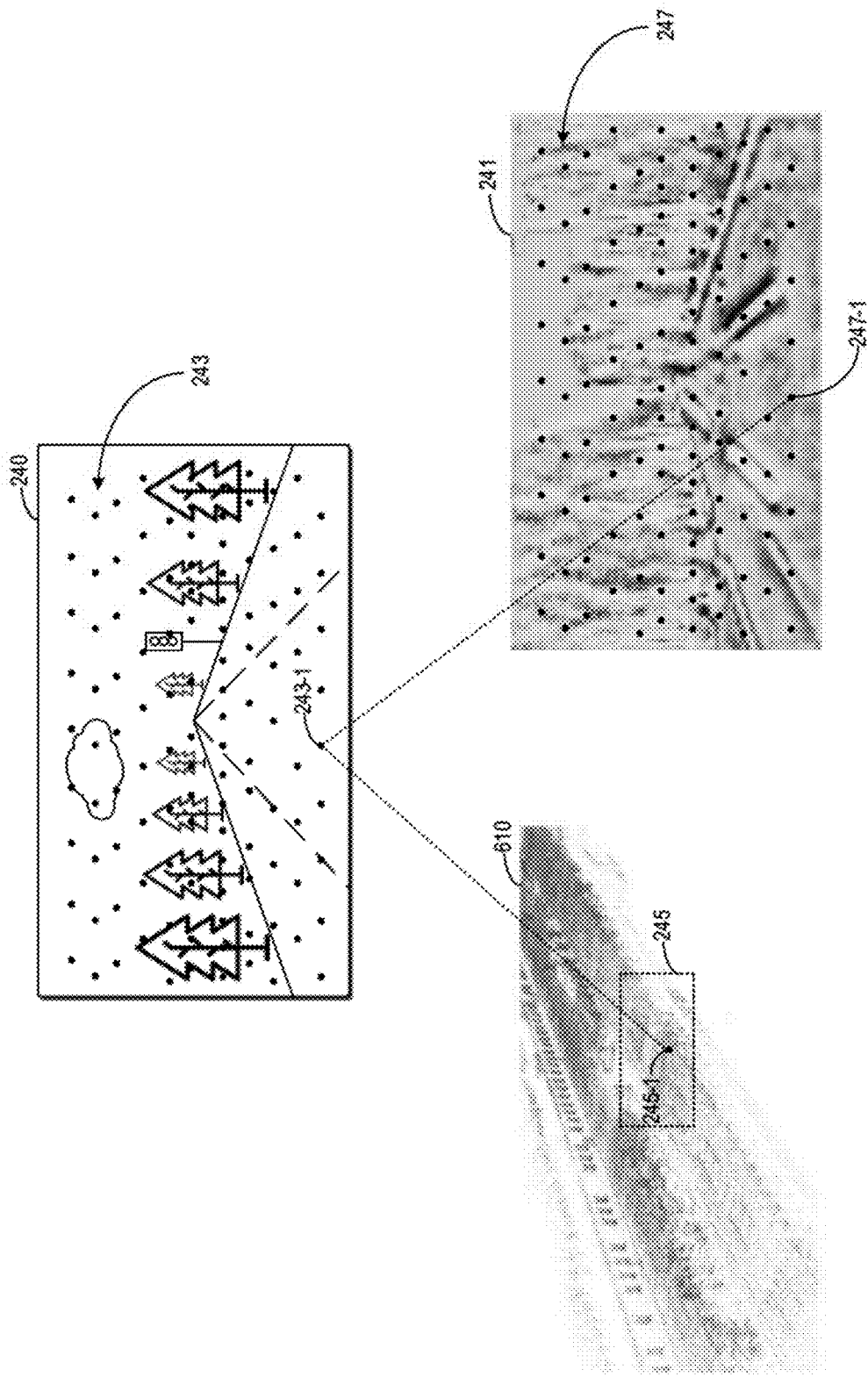
FIG. 6 illustrates an example of a set of keypoints in a reference image as well as a set of reference descriptors and a set of spatial coordinate associated with the set of keypoints according to some embodiments of the present disclosure.

In addition to the set of reference descriptors 247, the computing device 210 may obtain a set of spatial coordinates 245 corresponding to the set of keypoints 243 of the reference image 240, for example, three-dimensional coordinates of three-dimensional space points corresponding to respective keypoints in the set of keypoints 243. It is worth noting that, since the reference image 240 is obtained by pre-capturing the external environment 105 by the capturing device, the capturing device may obtain three-dimensional coordinate information (e.g., a point cloud) of various objects in the external environment 105 simultaneously when capturing the reference image 240. As such, based on projection or three-dimensional reconstruction, and the like, the computing device 210 actually may determine a spatial coordinate corresponding to each point in the reference image 240. While, for the set of keypoints 243 in the reference image 240, the computing device 210 may determine a plurality of spatial coordinates (i.e., the set of spatial coordinates 245) corresponding to respective keypoints in the set of keypoints 243. Reference will be made to FIG. 6 below to further illustrate a specific example of the set of keypoints 243, the set of spatial coordinates 245 and the set of reference descriptors 247 of the reference image 240.

FIG. 6 illustrates an example of a set of keypoints 243 stored as well as a set of reference descriptors 247 and a set of spatial coordinates 245 associated with the set of key points 243 in a reference image 240, according to the embodiments of the present disclosure. It should be appreciated that the specific distribution of the set of keypoints 243 in the reference image 240 depicted in FIG. 6 is provided merely as an example, without suggesting any limitation to the scope of the present disclosure. In other embodiments, the set of keypoints 243 may have any distribution over the reference image 240. For example, as compared with the distribution as shown in FIG. 6, the set of keypoints 243 may have a denser or sparser distribution over the reference image 240. In another example, the set of keypoints 243 may be distributed in a concentrated manner at the edge of the object, rather than distributed substantially evenly over the reference image 240.

For example, FIG. 6 shows therein a reference image 240, the first descriptor map 241 and a point cloud 610 associated with an external environment 105. In the reference image 240, the set of keypoints 243 includes a keypoint 243-1 which is also referred to as the first keypoint 243-1. Through three-dimensional reconstruction, projection, or the like, the computing device 210 may determine a spatial coordinate 245-1 corresponding to the first keypoint 243-1 from the point cloud 610. Likewise, for other keypoints in the set of keypoints 243, the computing device 210 may determine spatial coordinates corresponding to these other keypoints from the point cloud 610, thereby obtaining the set of spatial coordinates 245. On the other hand, given that the descriptors in the first descriptor map 241 correspond to the image points in the reference image 240, the computing device 210 may determine a reference descriptor 247-1 corresponding to the first keypoint 243-1 from the first descriptor map 241. In a similar manner, for other keypoints in the set of keypoints 243, the computing device 210 may determine reference descriptors corresponding to these other keypoints from the first descriptor map 241, thereby obtaining the set of reference descriptors 247.

As discussed above, during the localization process of the vehicle 110, the predicted pose 150 of the vehicle 110 may be a relatively inaccurate locating pose with accuracy less than the predetermined threshold. However, considering that the predicted pose 150 is obtained through measurement or the previous localization process depicted in FIG. 1, there may not be a significant difference between the predicted pose 150 and the real pose of the vehicle 110. In other words, the predicted pose 150 of the vehicle 110 may be regarded as "neighboring" the real pose. More specifically, in the embodiments of the present disclosure, if the pose of the vehicle 110 is a point in a multidimensional (e.g., six-dimension) space, it would be considered that the real pose of the vehicle 110 is adjacent to the predicted pose 150 in the six-dimensional space. In a simplified case, assuming that the vertical coordinate, pitch angle and roll angle in the pose of the vehicle 110 are known, the pose of the vehicle 110 can be considered as a three-dimensional (including an x coordinate, a y coordinate and a yaw angle) space point, and the real pose of the vehicle 110 is adjacent to the predicted pose 150 in the three-dimensional space. As a result, assuming that the predicted pose 150 is a point in a multidimensional space, the computing device 120 may select a plurality of points adjacent to the point and then update the predicted pose 150 based on the plurality of points, so as to obtain an updated predicted pose 180 much closer to the real pose of the vehicle 110. Correspondingly, during a training of the feature extraction model 135 and the pose prediction model 175, the computing device 210 may also obtain likewise a plurality of training poses 255 adjacent to the known pose 250 for training above-mentioned models.

Returning to FIG. 3, in light of the idea, the computing device 210 may obtain a plurality of training poses 255 by offsetting the known pose 250 from the real pose 252 at block 330. In general, the computing device 210 may obtain a plurality of training poses 255 adjacent to the known pose 250 in any appropriate offsetting manner. For example, the computing device 210 may offset randomly in the vicinity of the known pose 250 so as to obtain a predetermined number of training poses 255. In another example, the computing device 120 may offset uniformly in a predetermined offset amount in multiple dimensions of the known pose 250, so as to determine a plurality of training poses 255 around the known pose 250. Selection of the training pose 255 will be described below in the circumstance where the known pose 250 has three dimensions of a horizontal axis, a longitudinal axis and a yaw angle axis. Nonetheless, it should be appreciated that the embodiments of the present disclosure are equivalently applicable to an offsetting of a known pose 250 having any appropriate number of dimensions, so as to obtain a plurality of training poses 255. In addition, it is worth noting that, in the embodiments of the present disclosure, the plurality of training poses 255 may be represented by their absolute coordinates or offset amounts relative to the known pose 250. The two types of representations are substantially consistent, which can be readily converted into each other.

More specifically, in the circumstance where the known pose 250 includes three degrees of freedom, namely a horizontal axis, a longitudinal axis and a yaw angle, the computing device 210 may take a horizontal coordinate, a longitudinal coordinate and a yaw angle of the known pose as a center and offset from the center in three dimensions of a horizontal axis, a longitudinal axis and a yaw angle axis, with respective predetermined offset units and within predetermined maximum offset ranges, so as to determine a plurality of training poses 255. For example, assuming that the known pose 250 of the vehicle 110 has a horizontal coordinate of 10 meter, a longitudinal coordinate of 10 meter, and a yaw angle of 10°, it would be represented as (10 meter, 10 meter, 10°). Then, one of the plurality of training poses 255 obtained by offsetting the known pose 255 may be (10.5 m, 10 m, 10°), representing that the training pose offsets 0.5 meters in the horizontal axis relative to the known pose 250 and remains unchanged in the longitudinal axis and yaw angle axis. In this way, the computing device 210 may perform offsetting uniformly in the vicinity of the known pose 250 in a fixed manner so as to obtain a plurality of training poses 255, thereby increasing the probability that a plurality of candidate poses 155 cover the real pose of the vehicle 110 during the localization process of the vehicle 110. In addition, when the localization process depicted in FIG. 1 is used iteratively to determine the locating pose of the vehicle 110 with accuracy meeting the requirement, the training method through which training poses 255 are obtained by offsetting uniformly in the vicinity of the known pose 250 can also increase the speed at which the locating result of the vehicle 110 converges to the above locating pose.

Figure 7:
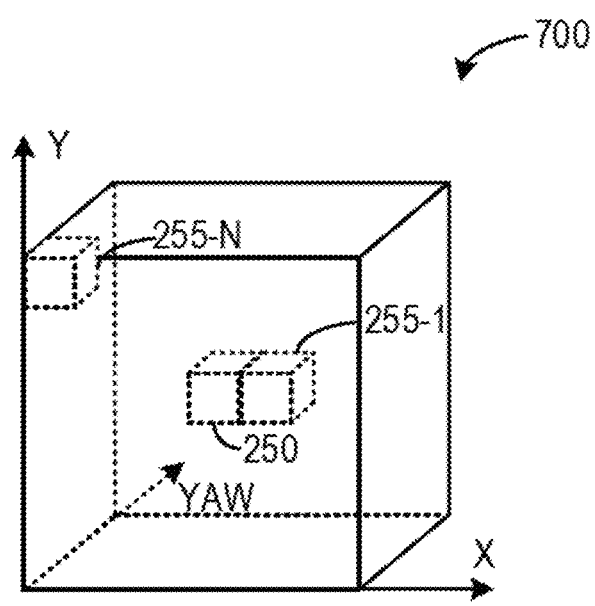
FIG. 7 illustrates a schematic diagram of a known pose and a plurality of training poses represented in the form of a cube according to some embodiments of the present disclosure.

Moreover, it should be pointed out that the predetermined unit of offset amount and the predetermined maximum offset range used herein may be determined based on a specific system environment and accuracy requirement. For example, if the computing device 210 iteratively determines the predicted pose 280 of the vehicle 110 using the example method 300 to train the feature extraction model 135 and the pose prediction model 175, then the predetermined unit of offset amount and the predetermined maximum offset range may be reduced gradually. This is because the predicted pose of the vehicle 110 becomes more and more precise with the increase of iteration counts during the localization process of the vehicle 110, and thus is getting closer and closer to the real pose of the vehicle 110 accordingly. In some embodiments, in order to represent and process data associated with a plurality of training poses 255 in a better way, the plurality of training poses 255 may be represented in the form of three-dimensional cubes with the known pose 250 as a center. Reference will be made to FIG. 7 below to describe the example in detail.

FIG. 7 illustrates a schematic diagram of a known pose 250 and a plurality of poses 255 in the form of cubes according to some embodiments of the present disclosure. As shown in FIG. 7, in a coordinate system consisting of an x axis (i.e., a horizontal axis), a y axis (i.e., a longitudinal axis) and a yaw axis, a cube 700 may be comprised of several small cubes (e.g., 250 and 255-1 to 255-N as marked in FIG. 7). The small cube in the center of the cube 700 may represent the known pose 250 and thus be referred to as small cube 250. For example, a small cube 255-1 representing the first training pose 255-1 is adjacent the small cube 250 in a positive direction of the horizontal axis and the longitudinal axis and yaw angle axis are identical to the small cube 250. In other words, relative to the known pose 250, the first training pose 255-1 is offset by a predetermined unit of offset amount (also referred to as predetermined stride size) in the positive direction of the horizontal axis.

Figure 15:
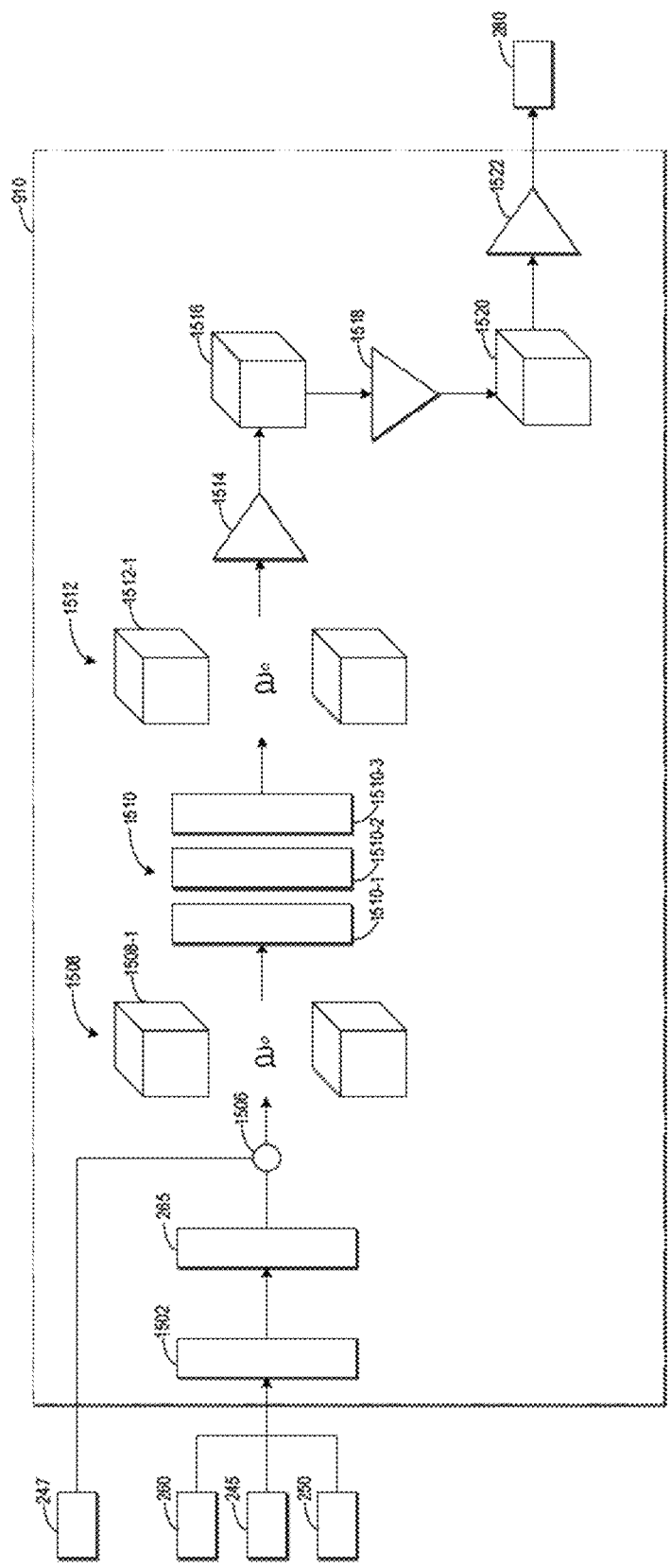
FIG. 15 illustrates an example structure of a feature matching model according to some embodiments of the present disclosure.

Likewise, in another example, the small cube 255-$n$ representing the $N^{th}$ training pose 255-N is offset by a predetermined maximum offset amount from the small cube 250 in a negative direction of the horizontal axis, in a predetermined maximum offset amount from the small cube 250 in a positive direction of the longitudinal axis, and in a predetermined maximum offset amount from the small cube 250 in a negative direction of the yaw angle. In this way, a plurality of training poses 255 obtained through offsetting from the known pose 250 may be represented in the form of small cubes included in the cube 700. In some embodiments, a cost volume of the training pose 255 represented in a similar form may be processed advantageously through a 3D convolutional neural network (3D CNN). Reference will be made to FIG. 15 below to describe the example in detail.

Figure 8:
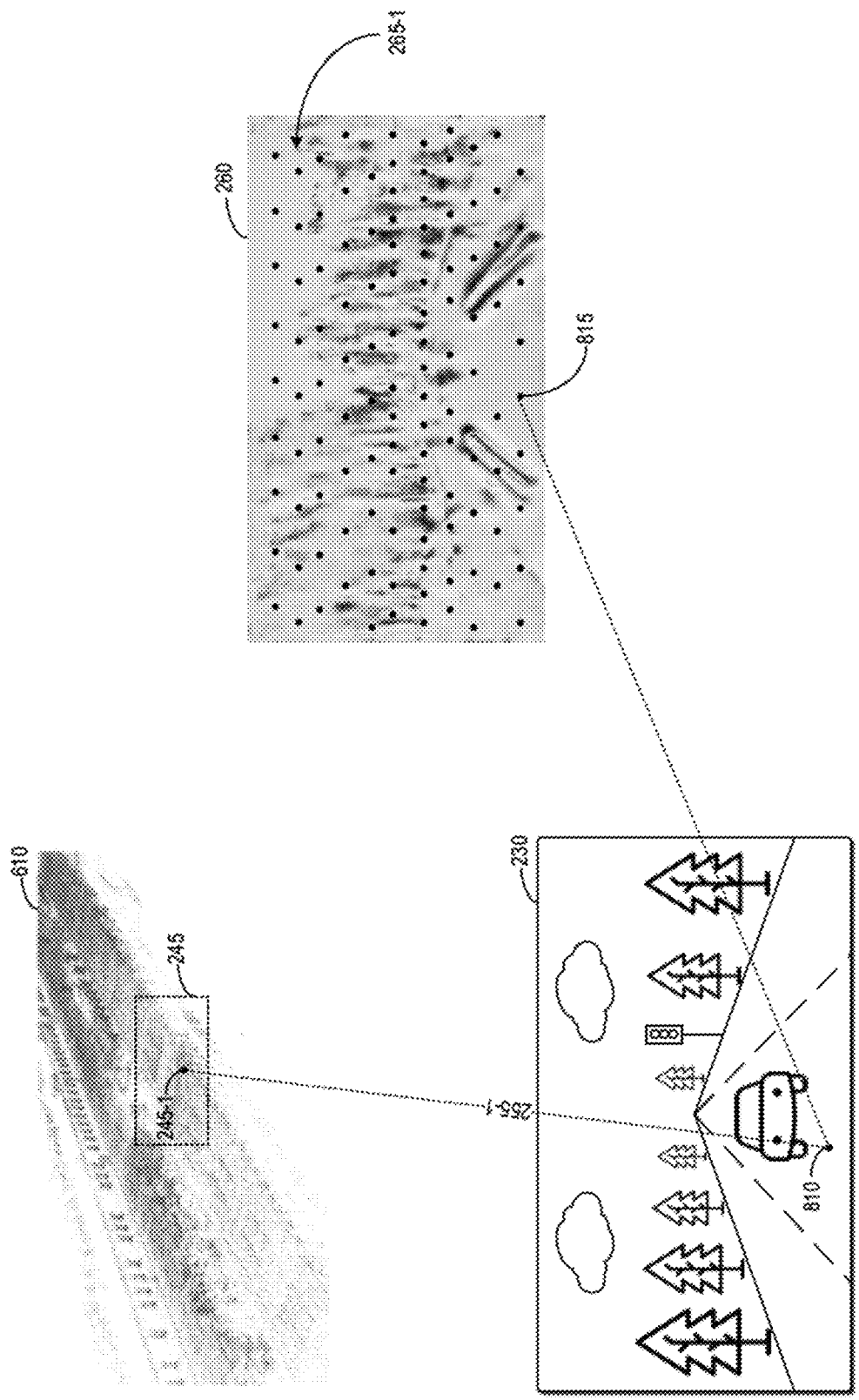
FIG. 8 illustrates a schematic diagram of determining the first set of training descriptors by projecting a set of spatial coordinates onto a captured image, assuming that the vehicle is in the first training pose, according to some embodiments of the present disclosure.

Returning to FIG. 3, at block 330, after obtaining the plurality of training poses 255 by offsetting from the known pose 250, assuming that the vehicle 110 is in the plurality of training poses 255, respectively, the computing device 210 may determine a plurality of sets of training descriptors 265 corresponding to the set of spatial coordinates 245, where the plurality of sets of training descriptors 265 belong to the second descriptor map 260. In other words, assuming that the vehicle 110 is at a certain training pose of the training poses 255, the computing device 210 may determine a plurality of training descriptors corresponding to respective spatial coordinates in the set of spatial coordinates 145, namely a set of training descriptors corresponding to the training pose, in the second descriptor map 260. Due to the presence of the plurality of training poses 255, the computing device 210 may determine a plurality of sets of training descriptors. Reference will be made to FIG. 8 below to describe, in the circumstance where the first training pose 255-1 in the plurality of training poses 255 is taken as an example, how the computing device 210 determines a set of training descriptors 265-1 corresponding to the set of spatial coordinates 245 assuming that the vehicle 110 is in the first training pose 255-1.

FIG. 8 illustrates a schematic diagram of determining the first set of training descriptors 265-1 by projecting a set of spatial coordinates 245 onto a captured image 230 when the vehicle 110 is in the first training pose 255-1. As shown in FIG. 8, in order to obtain the probability that the first training pose 255-1 in a plurality of training poses 255 determined by the localization system according to embodiments of the present disclosure is a real pose of the vehicle 110, the computing device 210 may assume that the vehicle 110 is in the first training pose 255-1. The computing device 210 then may determine related projection parameters or data for projecting the set of spatial coordinates 245 to the captured image 230 when the vehicle 110 is in the first training pose 255-1. For example, the projection parameters or data may include, but is not limited to, a conversion relation between the coordinate system of the vehicle 110 and the coordinate system of the imaging device of the vehicle 110, a conversion relation between the coordinate system of the vehicle 110 and the spatial coordinate system, various parameters of the imaging device of the vehicle 110, and the like.

With the projection parameters or data, the computing device 210 may project the first spatial coordinate 245-1 in the set of spatial coordinates 245 to the captured image 230, so as to determine a projection point 810 of the first spatial coordinate 245-1. Thereafter, in the second descriptor map 260 of the captured image 230, the computing device 210 may determine a training descriptor 815 corresponding to the projection point 810 so as to obtain a training descriptor of the set of training descriptors 265-1. Likewise, for other spatial coordinates in the set of spatial coordinates 245, the computing device 210 may determine the training descriptors corresponding to these other spatial coordinates, thus obtaining the set of training descriptors 265-1. It should be pointed out that, although it is described herein that the computing device 210 first projects the set of spatial coordinates 245 to the captured image 230 and then determines a corresponding set of training descriptors 265-1 from the second descriptor map 260, such description is provided merely as an example, without suggesting any limitation to the scope of the present disclosure. In other embodiments, the computing device 210 may project the set of spatial coordinates 245 directly into the second descriptor map 260 to determine a set of training descriptors 265-1 corresponding to the set of spatial coordinates 245.

Figure 14:
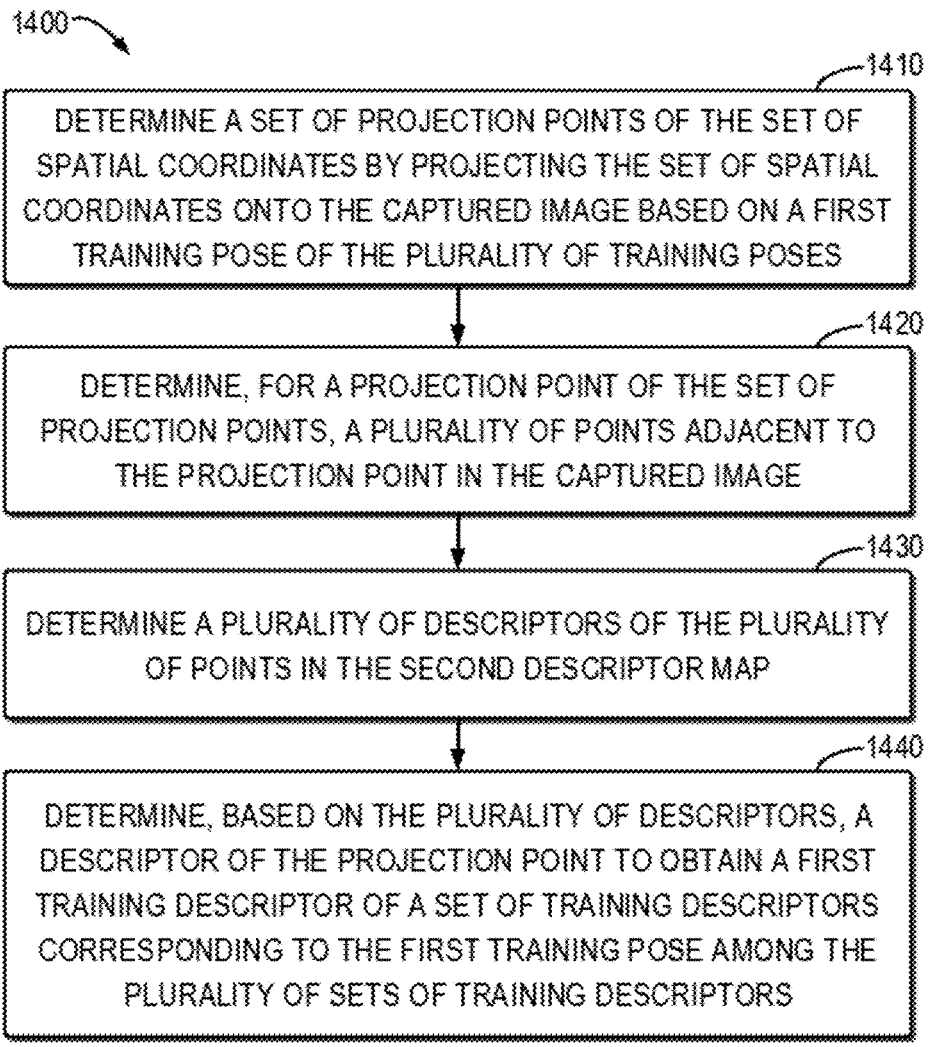
FIG. 14 illustrates a flowchart of an example process of determining a plurality of sets of training descriptors according to some embodiments of the present disclosure.

In addition, it is worth noting that, in some embodiments, the projection point 810 of the first spatial coordinate 245-1 in the captured image 230 may correspond exactly to an image point in the captured image 230, and the training descriptor 815 corresponding to the first spatial coordinate 245-1 thus may be determined directly from the second descriptor map 260. Nonetheless, in other embodiments, the projection point 810 of the first spatial coordinate 245-1 in the captured image 230 may not correspond directly to a certain point in the captured image 230 but falls among a plurality of image points in the captured image 230. In those embodiments, based on a plurality of descriptors in the second descriptor map 260 corresponding to the plurality of image points around the projection point 810, the computing device 210 may determine the training descriptor 815 corresponding to the projection point 810. Reference will be made to FIG. 14 below to describe the example.

Referring back to FIG. 3, at block 340, the computing device 210 may determine a plurality of similarities 270 between a plurality of sets of training descriptors 265 and the set of reference descriptors 247. In other words, for a set of training descriptors among the plurality of training descriptors 265, the computing device 210 may determine a similarity between the set of training descriptors and the set of reference descriptors 247, thereby determining a similarity in the plurality of similarities 270. For example, referring to FIG. 2, for the first set of training descriptors 265-1 among the plurality of sets of training descriptors 265, the computing device 210 may determine the first similarity 270-1 between the first set of training descriptors and the set of reference descriptors 247. For other sets of training descriptors among the plurality of sets of training descriptors 265, the computing device 210 may determine likewise their similarities with the set of reference descriptors 247, so as to finally obtain a plurality of similarities 270. It should be appreciated that a plurality of sets of training descriptors 265 are obtained under the assumption that the vehicle 110 is in a plurality of training poses 255, respectively, and the plurality of similarities 270 corresponding to the plurality of sets of training descriptors 265 actually correspond to the plurality of training poses 255.

The computing device 210 may typically determine the first similarity 270-1 between the first set of training descriptors 265-1 and the set of reference descriptors 247. For example, the computing device 210 may compute a difference between the mean value of the first set of training descriptors 265-1 and the mean value of the set of the reference descriptors 247, as the first similarity 270-5. As another example, the computing device 210 may compute the first similarity 270-1 based on some descriptors in the first set of training descriptors 265-1 and respective descriptors in the set of reference descriptors 247. For a further example, the computing device 210 may determine a plurality of differences between respective pairs of descriptors in the first set of training descriptors 265-1 and the set of reference descriptors 247 and then determine the first similarity 270-1 based on the plurality of differences. The first set of training descriptors 265-1 will be taken below as an example to describe the first similarity 270-1 of the set of reference descriptors 247.

As aforementioned, the first set of training descriptors 265-1 include a plurality of training descriptors which correspond to respective spatial coordinates in the set of spatial coordinates 245. On the other hand, the set of spatial coordinates 245 and the set of reference descriptors 247 are also in a correspondence relation. In other words, the first set of training descriptors 265-1 and the set of reference descriptors 247 both correspond to the set of spatial coordinates 245. For example, referring to FIGS. 6 and 8, the first set of spatial coordinates 245-1 in the set of spatial coordinates 245 corresponds to a reference descriptor 247-1 in the set of reference descriptors 247, and has a corresponding training descriptor 815 in the first set of training descriptors 265-1. That is, each training descriptor in the first set of training descriptors 265-1 has a respective reference descriptor in the set of reference descriptors 247. As a result, the first similarity 270-1 between the first set of training descriptors 265-1 and the set of reference descriptors 247 may be determined synthetically based on the differences between all respective pairs of descriptors thereof. In this way, since all the differences between all the respective pairs of descriptors are counted, the accuracy of the first similarity 270-1 between the first set of training descriptors 265-1 and the set of reference descriptors 247 can be improved.

More specifically, for the first set of training descriptors 265-1 among the plurality of sets of training descriptors 265, the computing device 210 may determine a plurality of differences between respective training descriptors in the first set of training descriptors 265-1 and respective reference descriptors in the set of reference descriptors 247. For example, in the circumstance where the training descriptors and the reference descriptors are all represented in the form of an n-dimensional vector, for each corresponding "training descriptor-reference descriptor" pair, the computing device 210 may compute a distance L2 between the two paired descriptors as the difference between the two descriptors. Of course, the use of the distance L2 between descriptors to represent the difference between descriptors is merely an example, without suggesting any limitation to the scope of the present disclosure. In other embodiments, the computing device 210 may also utilize any other appropriate metric to represent the difference between two descriptors.

Subsequent to determining a plurality of differences between corresponding descriptor pairs between the first set of training descriptors 265-1 and the set of reference descriptors 247, the computing device 120 may determine, based on the plurality of differences, the similarity between the first set of training descriptors 265-1 and the set of reference descriptors 247, namely the first similarity 270-1 of the plurality of similarities 270. For example, in a direct, simple manner, the computing device 210 may sum up the plurality of differences to obtain a total difference of the plurality of descriptor pairs as the first similarity 270-1. In other embodiments, the computing device 210 may obtain the first similarity 270-1 from the above-mentioned plurality of differences in any other appropriate manner as long as the plurality of differences are taken into consideration for obtaining the first similarity 270-1. For example, the computing device 210 may perform averaging, weighted averaging, or weighted summing on the plurality of differences, and average or sum up some differences falling in a predetermined interval, or the like.

At block 340, after obtaining the plurality of similarities 270 corresponding to the plurality of training poses 255, the computing device 210 may input the plurality of training poses 255 and the plurality of similarities 270 into the pose prediction model 175 to obtain a predicted pose 280 of the vehicle 110. It is worth noting that the predicted pose 280 used herein refers to a predicted pose of the vehicle 110 given by the localization system during model training, therefore it is different than the predicted pose 150 of the vehicle 110 during localization process depicted in FIG. 1. It should be appreciated that the plurality of similarities 270 actually reflect respective proximity of the plurality of training poses 255, given by the localization system, to the real pose 252 of the vehicle 110 when capturing a captured image 230. For example, the similarity 270-1 corresponding to the first training pose 255-1 may reflect the proximity of the first training pose 255-1 to the real pose 252 of the vehicle 110. In other words, the plurality of similarities 270 may be considered as reflecting probabilities that the plurality of training poses 255 given by the localization system are the real pose of the vehicle 110, respectively. As such, the computing device 210 may obtain the predicted pose 280 of the vehicle 110 (i.e., the predicted pose 280 determined by the localization system including the feature extraction model 135 and the pose prediction model 175) from the plurality of training poses 255 and the plurality of respective similarities 270.

As an example, the pose prediction model 175 may determine from the plurality of similarities 270 probabilities that the plurality of training poses 255 are the real poses of the vehicle 110, respectively. For example, the pose prediction model 175 may normalize the plurality of similarities 270 to make the sum of the plurality of normalized similarities 270 equal to 1. The pose prediction model 175 then may take the plurality of normalized similarities 270 as respective probabilities of the plurality of training poses 255. It should be appreciated that normalization for the plurality of similarities 270 used herein is provided merely as an example, without suggesting any limitation to the scope of the present disclosure. In other embodiments, the pose prediction model 175 may apply other appropriate computing manners (e.g., weighted normalization of the plurality of similarities 270, and the like) so as to obtain from the plurality of similarities 270 probabilities that a plurality of training poses 255 are real poses, respectively.

After obtaining the probabilities that the plurality of training poses 255 are real poses, respectively, the pose prediction model 175 may determine, from the plurality of training poses 255 and their probabilities, an expected pose of the vehicle 110 as the predicted pose 280. As such, all the training poses 255 are included in the final predicted pose 280 according to the probabilities to enhance the training effect of the feature extraction model 135 and the pose prediction model 175, thus improving the localization accuracy of the localization system including the aforesaid two models. As would be appreciated, it is merely an example that the pose prediction model 175 uses the expected pose as a predicted pose 280, without suggesting any limitation to the scope of the present disclosure. In other embodiments, the pose prediction model 175 may determine the predicted pose 280 in other appropriate manners. For example, the pose prediction model 175 may directly use the training pose having the greatest probability as the predicted pose 280, or determine the predicted pose 280 based on several training poses having probabilities ranked in the top, and so on. In addition, it should be pointed out that, if a plurality of training poses 255 are represented in the form of offsets relative to the known pose 250 in the example process 300, the pose prediction model 175 may obtain the predicted pose 280 by summing up the known pose and the respective offsets determined in the example process 300.

At block 350, the computing device 210 may train the feature extraction model 135 and the pose prediction model 175 based on a difference metric 290 representing the difference between the predicted pose 280 and the real pose 252 of the vehicle 110, so as to apply the trained feature extraction model 135 and pose prediction model 175 to vehicle localization. It should be appreciated that, in the embodiments of the present disclosure, the difference metric 290 may be any metric capable of representing the difference between the predicted pose 280 and the real pose 252, which may be a metric directly indicating the difference therebetween, or a metric indirectly affecting the difference therebetween. Accordingly, based on different types of difference metrics 290, the computing device 210 may build different loss functions for training the feature extraction model 135 and pose prediction model 175. For example, in some embodiments, the difference metric 290 may include a deviation between the predicted pose 280 and the real pose 252, and the loss functions built based on such difference metric 290 may be collectively referred to as absolute loss function.

As an illustrative example, in the circumstance where a pose of the vehicle 110 has three degrees of freedom (i.e., x, y, yaw), assuming that the known pose 250 input into the computing device 210 is represented in the form of a true offset relative to the real pose 252 of the vehicle 110, which may be expressed as $\Delta T^* = (\Delta x^*, \Delta y^*, \Delta yaw^*)$, while the predicted pose 280 output by the computing device 210 adopts the predicted offset relative to the real pose of the vehicle 110, which may be expressed as $\Delta\hat{T}=(\Delta\hat{x}, \Delta\hat{y}, \Delta\hat{yaw})$, then the difference metric 290 may be represented as a deviation between the true offset and the predicted offset, as such the absolute loss function (also referred to as the first loss function) built thereon may be expressed as: $Loss_1=|\Delta\hat{x}-\Delta x^*|+|\Delta\hat{y}-\Delta y^*|+|\Delta\hat{yaw}-\Delta yaw^*|$. It should be appreciated that the absolute loss function represented in the form of a specific mathematic formula is provided merely as an example, without suggesting any limitation to the scope of the present disclosure. In other embodiments, the deviation between the predicted pose 280 and the real pose 252 may be represented in other forms, such as the sum of squares of derivations in three degrees of freedom, the mean of derivations in three degrees of freedom, and the like. By training the feature extraction model 135 and the pose prediction model 175 based on the absolute loss function, the computing device 210 can improve the localization accuracy of the localization system including the trained feature extraction model 135 and pose prediction model 175.

In some other embodiments, as aforementioned, during the determination of the predicted pose 280, the pose prediction model 175 may provide, based on a plurality of similarities 270, probabilities that a plurality of training poses 255 are real poses, respectively, and further obtain the predicted pose 280 based on the plurality of training poses 255 and their respective probabilities. In those embodiments, the difference metric 290 may include the concentration of distribution of the probabilities of the plurality of training poses 255 determined by the pose prediction model 175. Both theory and experiment demonstrate that the concentration of distribution of the probabilities have a significant impact on the robustness of the localization system of the vehicle 110. A loss function built based on such difference metric 290 may be referred to as aggregation loss function. More specifically, for the respective probabilities of the plurality of training poses 255 determined by the pose prediction model 175, a training pose close to the real pose of the vehicle 110 may preferably have a higher probability such that the localization system can have better robustness.

In light of the idea, assuming that the real pose 252 of the vehicle 110 is a mean value for computing a mean absolute deviation (MAD), the computing device 210 may use the mean absolute deviation to measure a degree of aggregation of the probability distribution of a plurality of training poses, which may be mathematically expressed as: $\sigma_w=\Sigma_i P(\Delta w_i) \cdot |\Delta w_i - \Delta w^*|$, where $w\in\{x, y, yaw\}$, i.e., w denotes one of the degrees of freedom, i indicates a certain training pose, P is a probability that a training pose provided by the localization system is a real pose, and the training pose 255 and the known pose 250 are both represented in the form of an offset relative to the real pose 252. As a consequence, considering synthetically the three degrees of freedom, the aggregation loss function (also referred to as the second loss function) built by the computing device 210 based on such difference metric 290 may be expressed as: $Loss_2=\sigma_x+\sigma_y+\sigma_{yaw}$. It should be appreciated that the aggregation loss function expressed in the form of a specific mathematical formula is provided merely as an example, without suggesting any limitation to the scope of the present disclosure. In other embodiments, the above mean absolute deviation formula may be replaced with other mathematical computing expressions having a similar function. By training the feature extraction model 135 and the pose prediction model 175 based on the aggregation loss function, the computing device 210 can boost the localization robustness of a localization system including the trained feature extraction model 135 and pose prediction model 175.

In other embodiments, during a determination of the predicted pose 280, the pose prediction model 175 may generate a plurality of regularized similarities based on a plurality of similarities 270 and obtain the predicted pose 280 based on the plurality of regularized similarities. In those embodiments, the difference metric 290 may also be determined based on the plurality of regularized similarities, and a loss function built based on the difference metric 290 may be referred to as similarity loss function. More specifically, considering the physical world, in addition to geometrical constraints, the same spatial coordinate (i.e., a 3D point) in the set of spatial coordinates 245 should preferably have a similar descriptor in the second descriptor map 260 and the first descriptor map 241 between two respective image points (i.e., two-dimensional points) in the captured image 230 and the reference image 240.

In accordance with the idea, the computing device 210 may define the similarity loss function (also referred to as the third loss function) as follows: $Loss_3=\Sigma_p \max(\hat{P}(p)-C,0)$, where $\hat{P}(p)$ denotes, for a spatial coordinate p in the set of spatial coordinates, a distance between a pair of respective descriptors in the captured image 230 and the reference image 240, and C is a constant which may be valued according to a specific technical environment, precision requirement, and the like, for example, C=1.0. In practice, the third loss function may be determined in multiple ways, and reference will be made to FIGS. 16A and 16B below to describe specific examples. It should be appreciated that the similarity loss function represented using a specific mathematical formula is provided only as an example, without suggesting any limitation to the scope of the present disclosure. In other embodiments, the above formula for the similarity loss function may be replaced with other mathematical computing manners having a similar function. By training the feature extraction model 135 and the pose prediction model 175 based on the similarity loss function, the computing device 210 can improve the of robustness of localization of a localization system including the trained feature extraction model 135 and pose prediction model 175.

In some embodiments, the computing device 210 may use separately one of the aforesaid three types of loss functions to train the feature extraction model 135 and pose prediction model 175. In other embodiments, the computing device 210 may build a total loss function based on a combination of two or more loss functions from the above three types of loss functions. For example, the three types of loss functions may be combined into a total loss function according to respective weights, so as to jointly supervise training of the feature extraction model 135 and the pose prediction model 175, such that the optimum localization system of the vehicle 110 is obtained. In the form of a mathematical representation, an example total loss function may be expressed as follows: $Loss=\alpha\cdot Loss_1+\beta\cdot Loss_2+Loss_3$, where $\alpha$ and $\beta$ are balance factors for adjusting respective weights of different loss functions in the total loss function, which may be valued according to a specific technical environment, precision requirement, and the like.

In some embodiments, in order to accomplish an efficient training process of the feature extraction model 135 and the pose prediction model 175, the computing device 250 may add random noise to the known pose 250 to feed back a better input to the pose prediction model 175. In addition, in some embodiments, the localization system according to embodiments of the present disclosure may be iteratively used to determine a predicted pose of the vehicle 110 as the training is iteratively performed during the training process of the localization system. However, in the previous rounds of coarse iterative training, the localization system through preliminary training may provide a highly accurate predicted pose, making several further rounds of finer iterative training impossible. In this circumstance, the computing device 210 may add random noise again to the predicted pose generated in the previous rounds of coarse iterative training, for the sake of several subsequent rounds of finer iterative training.

Figure 9:
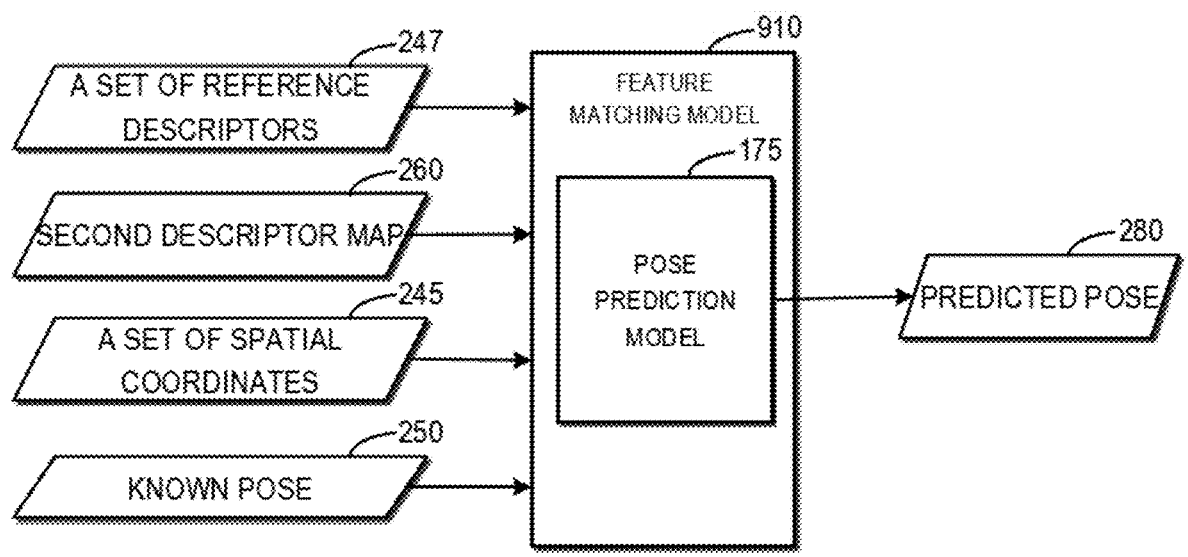
FIG. 9 illustrates a schematic diagram of obtaining a predicted pose by inputting a set of spatial coordinates, a set of reference descriptors, a known pose and the second descriptor map into a feature matching model including a pose prediction model, according to some embodiments of the present disclosure.

In the embodiments described above, at blocks 330 through 350 of the example process 300, the computing device 210 obtains the predicted pose 280 by processing step by step data including the set of spatial coordinates 245, the set of reference descriptors 247, the known pose 250, the second descriptor map 260, and the like. In other embodiments, the computing device 210 may complete the processing operations at blocks 330 through 350 in a modular way (i.e., it may build processing modules for implementing a pose prediction function so as to process the data as mentioned above), thereby obtaining the predicted pose 280. In the context of the present disclosure, the processing module may also be referred to as feature matching (FM) module. In some embodiments, the feature matching module may be implemented by a combination of a pose prediction model 175 and a functional module for generating training poses 255 and similarities 270. Reference will be made below to FIG. 9 to describe such example.

FIG. 9 illustrates a schematic diagram of inputting a set of spatial coordinates 245, a set of reference descriptors 247, a known descriptor 250 and the second descriptor map 260 into a feature matching module 910 including a pose prediction model 175 so as to obtain a predicted pose 280, according to some embodiments of the present disclosure. In some embodiments, the feature matching module 910 may be implemented at the computing device 210. In other embodiments, the feature matching module 210 may also be implemented at the computing device 120 of the vehicle 110. In some embodiments, the feature matching module 910 may be a deep learning-based machine learning module. Reference will be made to FIG. 15 below to describe in detail these embodiments.

Example Feature Extraction Model

As mentioned above when describing FIGS. 4 and 5, in some embodiments, the feature extraction model 135 for extracting the first descriptor map 241 from a reference image 240, or extracting the second descriptor map 260 from a captured image 230, may be implemented using a convolutional neural network based on a feature pyramid network (FPN). Reference will be made to FIG. 10 to describe the example. It should appreciated that the feature pyramid network architecture is only an example network architecture for the feature extraction model 135 according to some embodiments of the present disclosure, without suggesting any limitation to the scope of the present disclosure. In other embodiments, the feature extraction model 135 may also be a convolutional neural network of any other appropriate structure, or any other appropriate machine learning model.

FIG. 10 illustrates an example structure of the feature extraction model 135 according to some embodiments of the present disclosure. In the following, the feature extraction model 135 will be described by taking the captured image 230 as input and outputting the second descriptor map 260 as an example. However, it should be appreciated that the feature extraction model 135 is equivalently applicable to output the first descriptor map 241, using a reference image 240 as the input. As shown in FIG. 10, the feature extraction model 135 having feature pyramid network architecture may include an encoder 1050 and a decoder 1060, where the decoder 1060 may include lateral connection layers 1030 and 1032. The lateral connection layers 1030 and 1032 may merge feature maps of the same spatial size routed from the encoder 1050 to the decoder 1060, such that the feature pyramid network of the feature extraction model 135 can enhance high-level semantic meanings in all dimensions, thereby achieving a more powerful feature extractor.

In the example of FIG. 10, the captured image 230 may be input to the encoder 1050 of the feature extraction model 135, where the encoder 1050 may include four stages. The first stage may include two convolutional layers 1002 and 1004. The convolutional layer 1002 may have 16 channels, 3 kernels and a stride size of 1 while the convolutional layer 1004 may have 32 channels, 3 kernels and a stride size of 1. From the second stage, each stage may include a convolutional layer and two residual blocks, and each residual block may include two convolutional layers. For example, the second stage may include a convolutional layer 1006 and two residual blocks 1008 and 1010, the third stage may include a convolutional layer 1012 and two residual blocks 1014 and 1016, and the fourth stage may include a convolutional layer 1018 and two residual blocks 1020 and 1022.

In some embodiments, the convolutional layers 1002, 1004, 1006, 1012 and 1018 may be two-dimensional (2D) convolutional layers while the residual blocks 1008, 1010, 1014, 1016, 1020 and 1022 may all include two 3×3 convolutional layers. Therefore, the encoder 1050 may include 17 convolutional layers in total. Moreover, in some embodiments, the convolutional layer 1006 may have 64 channels, 3 kernels and a stride size 2 while the convolutional layers 1012 and 1018 may have 128 channels, 3 kernels and a stride size 2, respectively. The residual blocks 1008 and 1010 may have 64 channels and 3 kernels while the residual blocks 1014, 1016, 1020 and 1022 may have 1028 channels and 3 kernels.

In the decoder 1060, following the convolutional layer 1024, two upsampling layers 1026 and 1028 are applied to generate or hallucinate features with higher resolution from the coarser but semantically stronger features. Through the above-mentioned lateral connection layers 1030 and 1032, the features with the same resolution from the encoder 1050 may be averaged per element, so the features with the same resolution from the encoder 1050 may be combined to enhance these features in the decoder 1060. The output of the decoder 1060 may be feature maps with different resolutions of the original image (i.e., the captured image 230). In some embodiments, the convolutional layer 1024 may be a 2D convolutional layer, which may have 32 channels, 1 kernel and a stride size of 1. In some embodiments, the lateral connection layers 1030 and 1032 each may be a 2D convolutional layer and have 32 channels, 1 kernel and a stride size of 1.

The output of the decoder 1060 may be fed back to a network head 1034 which may be responsible for extracting descriptors and outputting the second descriptor map 260. In some embodiments, the network head 1034 may include two convolutional layers, such as 2D convolutional layers. The preceding convolutional layer may have 32 channels, 1 kernel and a stride size of 1 while the subsequent convolutional layer may have 8 channels, 1 kernel and a stride size of 1. In some embodiments, feature descriptors in the second descriptor map 260 output via the network head 1034 may be represented in the form of D-dimensional vectors. These feature descriptors can still achieve robustness matching even in spite of a significant object appearance change caused by varying lighting or viewpoint conditions. For example, the second descriptor map 260 may be expressed as a three-dimensional (3D) tensor F $$R^{\frac{H}{s} \times \frac{W}{s} \times D},$$

where H and W represent resolutions in height and width of the input captured image 230, respectively, $s \in 2, 4, 8$ is a scale factor, $D=8$ is a descriptor dimension size in the second descriptor map 260, and R denotes a set of real numbers.

By adopting the example feature pyramid network architecture depicted in FIG. 10, the first descriptor map 241 and the second descriptor map 260 respectively extracted by the feature extraction model from the reference image 240 and the captured image 230 may include feature descriptors more robust in matching. Therefore, when applied to the technical solution for vehicle localization according to the embodiments of the present disclosure, the feature extraction model 135 having the above-mentioned structure may help improve the robustness of vehicle localization.

Example Process of Obtaining Set of Reference Descriptors and Set of Spatial Coordinates As mentioned above when describing block 320 of the example process 300, in some embodiments, the computing device 210 or other entity (e.g., other computing devices) may generate and store a set of associated keypoints, a set of reference descriptors and a set of spatial coordinates, for each of the set of reference images for the external environment 105. As used herein, a map associated with the external environment 105, including data or content, such as sets of keypoints in a plurality of reference images, sets of reference descriptors, sets of spatial coordinates, and the like, may also be referred to as a localization map. Therefore, in those embodiments, for a set of keypoints 243 of a reference image 240, the computing device 210 may obtain a corresponding set of spatial coordinates 245 and a corresponding set of reference descriptors 247 from the localization map of the external environment 105. References will be made to FIGS. 11 and 12 below to describe those embodiments in detail.

FIG. 11 illustrates a flowchart of an example process 1100 of obtaining the set of reference descriptors 247 and the set of spatial coordinates 245 corresponding to the set of keypoints 243, according to the embodiments of the present disclosure. In some embodiments, the example process 1100 may be implemented by the computing device 210, for example, a processor or processing unit of the computing device 210, or various functional modules of the computing device 210. In other embodiments, the example process 1100 may be implemented by the computing device 120 of the vehicle 110, or other units or modules in the example environment 100.

Figure 13:
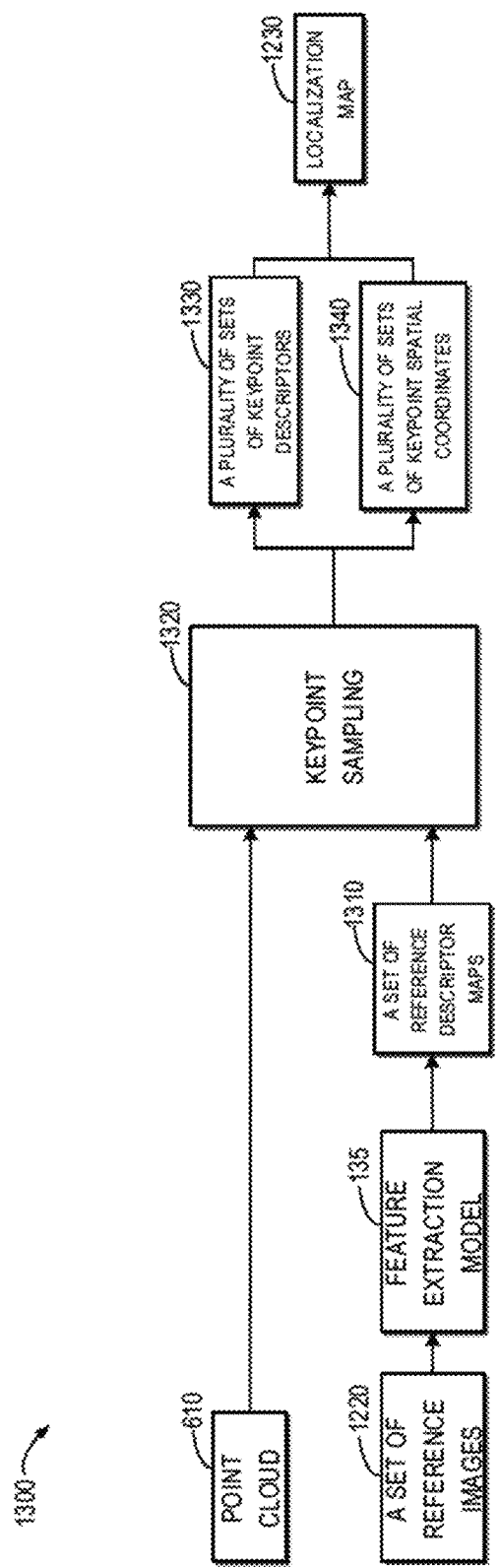
FIG. 13 illustrates an example modularized operation process of generating a localization map according to some embodiments of the present disclosure.

FIG. 12 illustrates a schematic diagram of capturing, by a capture vehicle 1210, a set of reference images 1220 of an external environment 105 and generating a localization map 1230, according to some embodiments of the present disclosure. As shown in FIG. 12, at some time before the vehicle 110 captures a captured image 230, the capture vehicle 1210 may capture data for the external environment 105. In some embodiments, the capture vehicle 1210 may capture a set of reference images 1220 of the external environment 105 during traveling. For example, the set of reference images 1220 may be in the form of a video. Of course, the set of reference images 1220 may also be in the form of multiple consecutive images. As shown, the reference image 240 may be included in the set of reference images 1220. Furthermore, the capture vehicle 1210 may use a laser radar scanner or the like to obtain a point cloud 610 of the external environment 105. Then, the computing device 210 or other computing device may generate a localization map 1230 based on the set of reference images 1220 and the point cloud 610. Reference will be made to FIG. 13 below to describe an example working process of the localization map 1230 in detail.

In some embodiments, each of the set of reference images 1220 may include sets of keypoints which may be stored in the localization map 1230. Moreover, the localization map 1230 further stores associatively therein respective sets of reference descriptors and respective sets of spatial coordinates corresponding to the sets of keypoints. For example, the localization map 1230 may store therein a set of keypoints 243 in a reference image 240, as well as a set of reference descriptors 247 and a set of spatial coordinates 245 associated with the set of keypoints 243, where the set of spatial coordinates 245 may be determined by projecting the laser radar point cloud 610 to the reference image 240.

Referring to FIGS. 11 and 12, it is assumed that the localization map 1230 may be used by the computing device 210 to train the feature extraction model 135 and the pose prediction model 175, and the computing device 210 has already obtained the captured image 230 by capturing the external environment 105 for training the feature extraction model 135 and the pose prediction model 175. As such, at block 1110 of FIG. 11, the computing device 210 may obtain a set of reference images 1220 of the external environment 105. For example, the computing device 210 may obtain the set of reference images 1220 from the capture vehicle 1210 for capturing the set of reference images 1220. In another example, the set of reference images 1220 may be stored at a further device, and the computing device 210 therefore may obtain the set of reference images 1220 from the further device storing the set of reference images 1220.

At block 1120 of FIG. 11, based on a known pose 250 of the vehicle 110, the computing device 210 may select a reference image corresponding to the captured image 230 from the set of reference images 1220. In this context, it is assumed that the reference image corresponding to the captured image 230 selected by the computing device 210 is the reference image 240. In some embodiments, the captured image 230 "corresponding to" the reference image 240 used herein may refer to that the difference between the pose of the capture vehicle 1210 when capturing the reference image 240 and the known pose 250 of the vehicle 110 is small enough, for example, below a predetermined threshold. Given the fact that the set of reference images 1220 is captured when the capture vehicle 1210 is performing measurement, pose information of the capture vehicle 1210 when each of the set of reference images 1220 is captured is retrievable. Consequently, in some embodiments, from all the reference images in the set of reference images 1220, the computing device 210 may determine and select the reference image 240 that is closest to the known pose 250 of the capture vehicle 1210. In some circumstances, the pose of the capture vehicle 1210 when capturing the reference image 240 may be identical to the known pose of the vehicle 110.

As aforementioned, in the localization map 1230, the set of keypoints 243 of the reference image 240 are stored in association with the set of spatial coordinates and the set of reference descriptors 247. Therefore, at block 1130 of FIG. 11, subsequent to determining the reference image 240 corresponding to the captured image 130 from the set of reference images 1220, the computing device 210 may obtain, from the localization map 1230, the set of spatial coordinates 245 and the set of reference descriptors 247 corresponding to the set of keypoints 243 of the reference image 240. For example, the computing device 210 may retrieve the set of keypoints 243, the set of spatial coordinates 245 and the set of reference descriptors 247 from the localization map 1230, using an identifier of the reference image 240.

Through the example process 1100, when the localization map 1230 is available to train the feature extraction model 135 and the pose prediction model 175, the computing device 210 can directly retrieve, based on the reference image 240 corresponding to the captured image 230, the set of spatial coordinates 245 and the set of reference descriptors 247, without a need to utilize the feature extraction model 135 to generate a set of reference descriptors 247, or use a three-dimensional rebuilding method to obtain a set of spatial coordinates 245. In this way, the computing loads and overhead of the computing device 120 can be reduced remarkably.

Example Process of Generating Localization Map

As mentioned above when describing FIG. 12, in some embodiments, the computing device 210 or other computing device may generate the localization map 1230 based on the set of reference images 1220 and the point cloud 610. In those embodiments, the pre-built localization map 1230 may be used as an input to the localization system during the localization process of the vehicle 110 to locate the vehicle 110, and may be used during the model training process to train the feature extraction model 135 and the pose prediction model 175. In essence, the localization map 1230 may be interpreted as encoding related information of the external environment 105. For example, the localization map 1230 may include a plurality of sets of keypoints in respective reference images in the set of reference images 1220 of the external environment 105, as well as a plurality of sets of reference descriptors and a plurality of sets of spatial coordinates associated therewith. Reference will be made to FIG. 13 below to describe an example working process of the localization map 1230.

It is worth noting that, in some embodiments, the localization map 1230 may be generated and stored by the computing device 120 or computing device 210 of the vehicle 110 based on various data captured by the capture vehicle 1210, so as to facilitate visual localization of the vehicle 110 based on the captured image 130 or for training the feature extraction model 135 and the pose prediction model 175. In other embodiments, the localization map 1230 may be generated and stored by other computing devices different than the computing device 120 or the computing device 210, or may be stored in a further device. In such circumstance, the computing device 120 or the computing device 210 may obtain the localization map 1230 from the further device storing the localization map 1230, in order to facilitate visual localization of the vehicle 110 based on the captured image or for training the feature extraction model 135 and the pose prediction model 175.

FIG. 13 illustrates an example modularized operation process 1300 of generating a localization map 1230 according to some embodiments of the present disclosure. For the purpose of illustration, reference will be made to FIGS. 5 and 6 below to describe the example operation process 1300 by taking the computing device 210 generating a localization map 1230 as an example. As shown in FIG. 13, the computing device 210 may input a set of reference images 1220 into the feature extraction model 135, so as to obtain a set of reference descriptors map 1310. For example, the computing device 210 may input respective reference images in the set of reference images 1220 one by one into the feature extraction model 135, so as to generate a plurality of reference descriptor maps corresponding to the respective reference images, namely a set of reference descriptor maps 1310. That is, the set of reference descriptor maps 1310 may include a reference descriptor map of each of the set of reference images 1220. For example, referring to FIG. 5, the set of reference descriptor maps 1310 may include the first descriptor map 241 of the reference image 240. In some embodiments, the feature extraction model 135 may have feature pyramid network architecture. In those embodiments, the reference descriptor maps in the set of reference descriptor maps 1310 may have different resolutions.

Returning to FIG. 13, the computing device 210 may input the set of reference descriptor maps 1310 into a keypoint sampling module 1320, so as to extract a set of corresponding keypoint descriptors from respective reference descriptor maps in the set of reference descriptor maps 1310, thereby obtaining a plurality of sets of keypoint descriptors 1330. More specifically, the plurality of sets of keypoint descriptors 1330 may include a set of keypoint descriptors corresponding to a set of keypoints in each reference image. For example, referring to FIG. 6, the keypoint sampling module 1320 may sample a set of reference descriptors 247 corresponding to the set of keypoints 243 from the first descriptor map 241. In some embodiments, the keypoint sampling module 1320 may extract a set of corresponding keypoint descriptors from each reference descriptor map in the set of reference descriptor maps 1320 using the same sampling method (e.g., a farthest point sampling algorithm), so as to simplify the process of generating a localization map 1230. In other embodiments, the keypoint sampling module 1320 may employ different keypoint sampling methods according to characteristics of each reference descriptor map, so as to extract a set of optimal keypoint descriptors for each reference descriptor map. In some embodiments, the feature extraction model 135 may have feature pyramid network architecture, and those reference descriptor maps in the set of reference descriptor maps 1310 may have different resolutions. In those embodiments, the keypoint sampling module 1320 may select different sets of keypoint descriptors for reference descriptor maps having different resolutions.

Returning back to FIG. 13, on the other hand, the point cloud 610 of the external environment 105 may be input to the keypoint sampling module 1320 such that the keypoint sampling module 1320 can obtain a plurality of sets of keypoint spatial coordinates 1340 corresponding to the plurality of keypoint descriptors 1330 by projection, three-dimensional rebuilding, and the like. To be specific, the plurality of keypoint spatial coordinates 1340 may include a set of spatial coordinates corresponding to a set of keypoints in each reference image. For example, referring to FIG. 6, the keypoint sampling module 1320 may sample a set of spatial coordinates 245 corresponding to the set of keypoints 243 from the point cloud 610.

Referring back to FIG. 13, the computing device 210 may store the plurality of sets of keypoints corresponding to the set of reference images 1220 in association with the plurality of keypoint descriptors 1330 and the plurality of sets of keypoint spatial coordinates 1340, for example, into a storage device (e.g., a disk), so as to generate the localization map 1230. As an example, referring to FIG. 6, the computing device 210 may store the set of keypoints 243 of the reference image 240 in association with the set of spatial coordinates 245 and the set of reference descriptors 247 into the localization map 1230.

Through the example operation flow 1300, the computing device 210 may efficiently and intensively generate the localization map 1230 of the external environment 105 of the vehicle 110 such that, when training the feature extraction model 135 and the pose prediction model 175, the computing device 210 may directly perform the training process using the localization map 1230 as an input. As a result, the computing loads and overheads of the computing device 210 for model training are significantly reduced. On the other hand, when locating the vehicle 110 based on the captured image 130, the computing device 120 of the vehicle 110 may retrieve related data and information for locating the vehicle 110 directly using the localization map 1130 as an input. As such, the computing loads and overheads of the computing device 210 for model training may also be cut down greatly, and the computing device 120 may spend remarkably less time on locating the vehicle 110. In addition, since the example operation process 1300 generates the localization map 1230 based on the feature extraction model 135 and the keypoint sampling model 1320, the localization map 1230 can be optimized by optimizing the feature extraction model 135 and the keypoint sampling model 1320, thereby improving the localization accuracy of the vehicle 110.

Example Process of Determining a Plurality of Sets of Training Descriptors

As mentioned above when describing FIG. 8, in some embodiments, the projection point 810 of the first spatial coordinate 245-1 projected into the captured image 230 may not directly correspond to a certain image point in the captured image 230, but falls among a plurality of image points in the captured image 230. In those embodiments, based on a plurality of descriptors corresponding to a plurality of image points around the projection point 810, the computing device 210 may determine a training descriptor 815 corresponding to the projection point 810. Reference will be made to FIG. 14 below to describe the example in detail.

FIG. 14 illustrates a flowchart of an example process 1400 of determining a plurality of sets of training descriptors 265 according to some embodiments of the present disclosure. In some embodiments, the example process 1400 may be implemented by a computer device 210, for example, a processor or processing unit of the computing device 210, or various functional modules of the computing device 210. In other embodiments, the example process 1400 may be implemented by the computing device 120 of the vehicle 110, or other unit or module in the example environment 100. For the purpose of illustration, reference will also be made to FIGS. 7 and 8 below to describe the example process 1400.

At block 1410, the computing device 210 may assume that the vehicle 110 is in the first training pose 255-1 in a plurality of training poses 255. Based on the first training pose 255-1, the computing device 210 may project the set of spatial coordinates 245 onto the captured image 230 such that the computing device 210 can determine a set of projection points of the set of the spatial coordinates 245, namely respective projection points corresponding to respective spatial coordinates in the set of spatial coordinates 245, respectively. For example, referring to FIG. 8, assuming that the vehicle 110 is in the first training pose 255-1, the computing device 210 may project the first spatial coordinate 245-1 in the set of spatial coordinates 245 onto the captured image 230, so as to determine the projection point 810 in the captured image 230. In a similar way, the computing device 210 can project other spatial coordinates in the set of spatial coordinates 245 onto the captured image 230, so as obtain a set of projection points of the set of the spatial coordinates 245.

Returning to FIG. 14, at block 1420, for a projection point of the set of projection points, the computing device 210 may determine a plurality of points adjacent to the projection point in the captured image 230. For example, referring to FIG. 7, the projection point 810 may not correspond exactly to an image point (e.g., a pixel) in the captured image 230 in some circumstances, thus it is possible that a corresponding descriptor 815 cannot be found directly in the second descriptor map 260. In this case, the computing device 210 may alternatively find a plurality of image points adjacent to the projection point 810 in the captured image 230, for example, two or more image points closest to the projection point 810. In other embodiments, the plurality of points adjacent to the projection point 810 determined by the computing device 210 are not necessarily multiple image points closest to the projection point 810, which can be any points as long as respective distances from those points to the projection point 810 are below a predetermined threshold.

Still referring to FIG. 14, for a plurality of points adjacent to the projection point, the computing device 210 may determine respectively a plurality of descriptors of the plurality of points in the second descriptor map 260 at block 1430. For example, referring to FIG. 7, if the computing device 210 determines two image points closest to the projection point 810 in the captured image 230, the computing device 210 may determine two descriptors of the two image points in the second descriptor image 260. In another example, if the computing device 210 determines three or more image points adjacent to the projection point 810, the computing device 210 may determine descriptors of those image points in the second descriptor map 260.

Referring to FIG. 14, based on a plurality descriptors of a plurality of points adjacent to the projection point, the computing device 210 may determine a descriptor of the projection point at block 1440. For example, referring to FIG. 7, based on the plurality of descriptors of the plurality of image points adjacent to the projection point 810, the computing device 210 may determine the descriptor 815 of the projection point 810. In an example method, the computing device 210 may use a bilinear interpolation algorithm to compute a descriptor 815 from the plurality of descriptors. It should be appreciated that the computing device 210 may obtain the descriptor 815 through any other appropriate algorithm. For example, the computing device 210 may directly compute a mean value of the plurality of descriptors as the descriptor 815, and so on. After determining the descriptor 815 of the projection point 810, the computing device 210 obtains the first training descriptor 815 in the set of training descriptors 265-1 corresponding to the first training pose 255-1 among the plurality of sets of training descriptors 265. The computing device 210 may determine likewise the plurality of sets of training descriptors 265 respectively corresponding to the plurality of training poses 255.

Through the example process 1400, even though there is no descriptor in the second descriptor map 260 directly corresponding to the projection point 810 of the spatial coordinate 245-1 in the captured image 230, the computing device 210 may reasonably determine a descriptor 815 for the projection point 810. The computing device 210 may further reasonably determine a set of training descriptors 265-1 corresponding to the first training pose 255-1. Moreover, the computing device 210 may reasonably determine a plurality of sets of training descriptors 265 corresponding to the plurality of training poses 255. In this way, the ultimate accuracy of the pose of the vehicle 110 determined based on the plurality of training poses 255 can be improved.

Example Feature Matching Model

As mentioned when describing FIG. 9, in some embodiments, the computing device 210 may determine a plurality of similarities between a plurality of sets of training descriptors 265 and a set of the reference descriptors 247 by inputting a set of reference descriptors 247, the second descriptor map 260, a set of spatial coordinates 245 and a known pose 250 into the feature matching model 910, and obtain a predicted pose 280 from an output of the feature matching model 910. Reference will be made to FIG. 15 below to describe the example. It should be appreciated that the specific structure of the feature matching model 910 depicted in FIG. 15 is provided merely as an example, without suggesting any limitation to the scope of the present disclosure. In other embodiments, the feature matching model 910 according to the embodiments of the present disclosure may utilize any other neural network structure.

FIG. 15 illustrates an example structure of the feature matching model 910 according to some embodiments of the present disclosure. As shown in FIG. 15, the computing device 210 may provide a set of spatial coordinates 245, a known pose 250 and the second descriptor map 260 to a projection unit 1502 of the feature matching model 910. In the projection manner as described with reference to FIG. 8 or 14, the projection unit 1502 may compute and output a plurality of sets of training descriptors 265 respectively corresponding to the plurality of training poses 255. Subsequently, for respective keypoints in the set of keypoints 243 of the reference image 240 (i.e., respective spatial coordinates in the set of spatial coordinates 245), a similarity computing unit 1506 may compute a plurality of similarities between training descriptors corresponding to a certain keypoint with a reference descriptor when the vehicle 110 is in respective training poses 255, so as to form a similarity cube corresponding to the keypoint. Likewise, for a plurality of keypoints in the set of keypoints 243, the similarity computing unit 1506 may obtain a plurality of corresponding similarity cubes 1508. The plurality of similarity cubes 1508 used herein may also be referred to a plurality of cost volumes.

For example, referring to FIGS. 6 to 8, for the keypoint 243-1 (i.e., the spatial coordinate 245-1), the similarity computing unit 1506 may compute a similarity between the training descriptor 815 and the reference descriptor 247-1 when the vehicle 110 is in the training pose 255-1. For the keypoint 243-1, the similarity computing unit 1506 may obtain a plurality of similarities for the plurality of training poses 255 in a similar manner. The plurality of similarities about the keypoint 243-1 may be recorded in a similarity cube 1508-1 corresponding to the keypoint 243-1 in the plurality of similarity cubes 1508. In other words, each cost volume in the plurality of cost volumes 1508 may correspond to a keypoint in the set of keypoints 243, and the number of cost volumes in the plurality of cost volumes 1508 therefore may be identical to the number of keypoints in the set of keypoints 243. In the cost volume 1508-1 corresponding to the first keypoint 243-1, the representation of the plurality of training poses 255 may be identical to that depicted in FIG. 7. That is, the known pose 250 may be represented by a small cube (not shown in FIG. 15) at the center of the cost volume 1508-1 while the plurality of training poses 255 may be denoted by small cubes (not shown in FIG. 15) distributed around the known pose 250. In addition, each small cube in the cost volume 1508-1 may record a similarity between the training descriptor 815 of the first keypoint 234-1 in the second descriptor map 260 and the reference descriptor 247-1 in the first descriptor map 241, when the vehicle 110 is at a corresponding training pose.

Then, the plurality of cost volumes 1508 may be input into a three-dimensional convolutional neural network (3D CNN) 1510 for regularization, so as to obtain a plurality of regularized cost volumes 1512. For example, after the cost volume 1508-1 is processed by 3D CNN 1510, a regularized cost volume 1512-1 may be obtained. In some embodiments, 3D CNN 1510 may include three convolutional layers 1510-1, 1510-2 and 1510-3, where the convolutional layers 1510-1 and 1510-2 may have 8 channels, 1 kernel and a stride size of 1, respectively while the convolutional layer 1510-3 may have a channel, a kernel and a stride size of 1. It should be appreciated that the specific numerical values related to the 3D CNN 1510 described herein are provided merely as an example, without suggesting any limitation to the scope of the present disclosure. In other embodiments, the 3D CNN 1510 may be of any appropriate structure.

Next, the computing device 210 may input the plurality of regularized cost volumes 1512 into a first dimensionality reduction and summation unit 1514 for dimensionality reduction (also referred to as marginalization) in the dimension of keypoint, so as to obtain a similarity cube 1516. For example, the first dimensionality reduction and summation unit 1514 may add the data recorded in the corresponding small cubes in the plurality of cost volumes 1512 after normalization, so as to obtain the similarity cube 1516. It should be appreciated that it is only an example to directly sum up the plurality of regularized cost volumes 1512, and the first dimensionality reduction and summation unit 1514 may obtain the similarity cube 1516 in other appropriate manner. For example, the first dimensionality reduction and summation unit 1514 may perform averaging, weighted summing, weighted averaging, or the like, on data recorded in respective small cubes in the plurality of regularized cost volumes 1512. In some embodiments, the first dimensionality reduction and summation unit 1514 may be implemented using a reduce sum function in a deep learning system TensorFlow. In other embodiments, the first dimensionality reduction and summation unit 1514 may be implemented using other similar function in the TensorFlow system or other deep learning system.

The representation of a plurality training poses 255 in the similarity cube 1516 may be identical to that depicted in FIG. 7, i.e., the known pose 250 may be represented by a small cube (not shown in FIG. 15) at the center of the similarity cube 1516 while the plurality of training poses 255 may be represented by small cubes (not shown in FIG. 15) distributed around the known pose 250. In addition, each small cube in the similarity cube 1516 stores a similarity between a set of training descriptors 265-1 of the set of keypoints 243 in the second descriptor map 260 and the set of reference descriptors 247 in the first descriptor map 241, when the vehicle 110 is in a respective training pose. For example, referring to FIG. 2, the small cube corresponding to the training pose 255-1 in the similarity cube 1516 stores a similarity 270-1 between the set of training descriptors 265-1 and the set of reference descriptors 247, when the vehicle 110 is in the training pose 255-1.

Thereafter, the computing device 210 may input the similarity cube 1516 into a normalization unit 1518 for normalization, thereby obtaining a probability distribution cube 1520. In some embodiments, the normalization unit 1518 may be implemented using a softmax function in the deep learning system TensorFlow. In other embodiments, the normalization unit 1518 may be implemented using other similar function in the TensorFlow system or other deep learning system. The representation of a plurality of training poses 255 in the probability distribution cube 1520 may be identical to the one depicted in FIG. 7. That is, the known pose 250 may be represented by a small cube (not shown in FIG. 15) at the center of the probability distribution cube 1520 while the plurality of training poses 255 may be represented by small cubes (not shown in FIG. 15) distributed around the known pose 250. Moreover, each cube in the probability distribution cube 1520 stores therein a probability that a respective training pose is a real pose of the vehicle 110 obtained by the feature matching model 910. For example, the small cube corresponding to the training pose 255-1 in the probability distribution cube 1520 stores a probability that the training pose 255-1 is a real pose of the vehicle 110 obtained by the feature matching model 910.

The computing device 120 then may input the probability distribution cube 1520 into the second dimensionality reduction and summation unit 1522, so as to obtain a predicted pose 280. For example, the second dimensionality reduction and summation unit 1522 may compute, based on the plurality of training poses 255 and a plurality of probabilities corresponding thereto, an expected pose of the vehicle 110 as the predicted pose 280. It should be appreciated that it is only an example to directly compute an expected pose based on the probabilities of the plurality of training poses 255, and the second dimensionality reduction and summation unit 1522 may obtain a predicted pose 280 in other appropriate manner. For example, the second dimensionality reduction and summation unit 1522 may first weight probabilities of a plurality of training poses 255 and then compute an expected pose as the predicted pose 280, and so on. In some embodiments, the second dimensionality reduction and summation unit 1522 may be implemented using a reduce_sum function in a deep learning system TensorFlow. In other embodiments, the second dimensionality reduction and summation unit 1522 may be implemented using other similar functions in the TensorFlow system or other deep learning system.

With the feature matching model 910 depicted in FIG. 15, the accuracy of the updated predicted pose 180 of the vehicle 110 ultimately determined by the localization system according to some embodiments of the present disclosure can be improved. In this regard, it is worth noting that the conventional visual localization solutions typically intend to solve the pose estimation problem within a random sampling consensus (RANSAC) algorithm framework given a set of 2D-3D keypoint correspondence, for example, using a PnP solver. Nonetheless, the conventional matching approaches including an outlier rejection step, are non-differentiable and thus prevent themselves from feature learning through backpropagation during the training stage. In contrast, the feature matching model 910 depicted in FIG. 15 leverages a differentiable 3D cost volume to evaluate the matching cost of respective feature descriptor pairs from a captured image and a reference image given a pose (or a pose offset) and finally boosts the accuracy of the updated predicted pose 180, thereby improving the performance of the localization system according to some embodiments of the present disclosure.

As indicated above in the description about FIG. 3, in practice, the third loss function (i.e., the similarity loss function) may be determined in multiple ways. Reference will be made to a regularized cost volume 1512-1 depicted in FIGS. 16A and 16B to describe in detail two different examples of determining a similarity loss function.

Figure 16A:
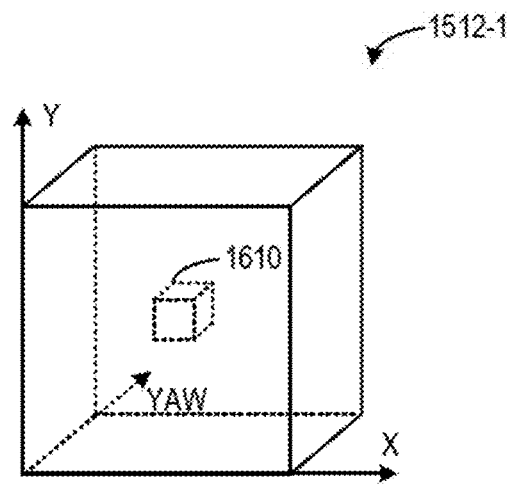
FIG. 16A illustrates an example of determining a difference metric based on a regularized similarity according to some embodiments of the present disclosure.

FIG. 16A illustrates an example of determining a difference metric 290 based on a regularized similarity 1512 according to some embodiments of the present disclosure. More specifically, FIG. 16A depicts a regularized cost volume 1512-1 corresponding to a keypoint 243-1 (i.e., a spatial coordinate 245-1) in the regularized similarity 1512 from the feature matching model 910 in FIG. 15. It is assumed in FIG. 16A that the known pose 250 input into the feature matching model 910 in FIG. 15 is identical to the real pose 252 of the vehicle 110. In this circumstance, the data recorded in the small cube 1610 at the center of the cost volume 1512-1 represents a similarity between a real pose 252 given by the feature matching model 910 and the real pose of the vehicle 110, namely a distance between a respective descriptor 815 and a respective descriptor 247-1 of the spatial coordinate 245-1 in the captured image 230 and the reference image 240 (i.e., the second descriptor map 260 and the first descriptor map 241). Furthermore, similarity loss functions for other keypoints of a set of keypoints 243 may be determined likewise, like the counterpart for the keypoint 243-1. Therefore, when the real pose 252 of the vehicle 110 is input into the feature matching model 910, the computing device 210 may determine the difference metric 290 and build a similarity loss function using a value P(p) recorded in a small cube at a center of each cost volume in the regularized cost volume 1512 depicted in FIG. 15.

Figure 16B:
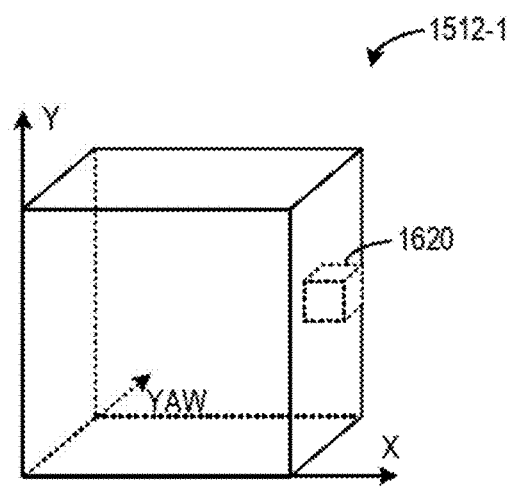
FIG. 16B illustrates a further example of determining a difference metric based on a regularized similarity according to some embodiments of the present disclosure.

FIG. 16B illustrates a further example of determining a difference metric 290 based on a regularized similarity 1512 according to some embodiments of the present disclosure. More specifically, FIG. 16B depicts a regularized cube 1512-1 corresponding to a keypoint 243-1 (i.e., a spatial coordinate 245-1) in the regularized similarity 1512 from the feature matching model 910. Unlike the example in FIG. 16A, it is assumed in FIG. 16B that the known pose 250 input into the feature matching model 910 in FIG. 15 is a known pose 250 obtained by offsetting the real pose 252 of the vehicle 110 in a known amount. In this circumstance, the small cube at the center of the cost volume 1512-1 represents the known pose 250. Furthermore, as the offset between the known pose 250 and the real pose 252 is known, the small cube corresponding to the real pose 252 of the vehicle 110 in the cost volume 1512 should also be known, which is assumed as a small cube 1620.

As such, the small cube 1620 in the cost volume 1512-1 may represent a similarity between the real pose 252 given by the feature matching model 910 and the real pose of the vehicle 110, namely a distance between a respective descriptor 815 and a respective descriptor 247-1 of the spatial coordinate 245-1 in the captured image 230 and the reference image 240 (i.e., the second descriptor map 260 and the first descriptor map 241). In addition, similarity loss functions for other keypoints of a set of keypoints 243 may be determined likewise, like the counterpart for the keypoint 243-1. Accordingly, when the known pose 250 of the vehicle 110 having a known offset from the real pose 252 is input into the feature matching model 910, the computing device 210 may determine the difference metric 290 and build a similarity loss function using a value P(p) recorded in a small cube at a fixed position in each cost volume in the regularized cost volume 1512 depicted in FIG. 15.

Figure 17:
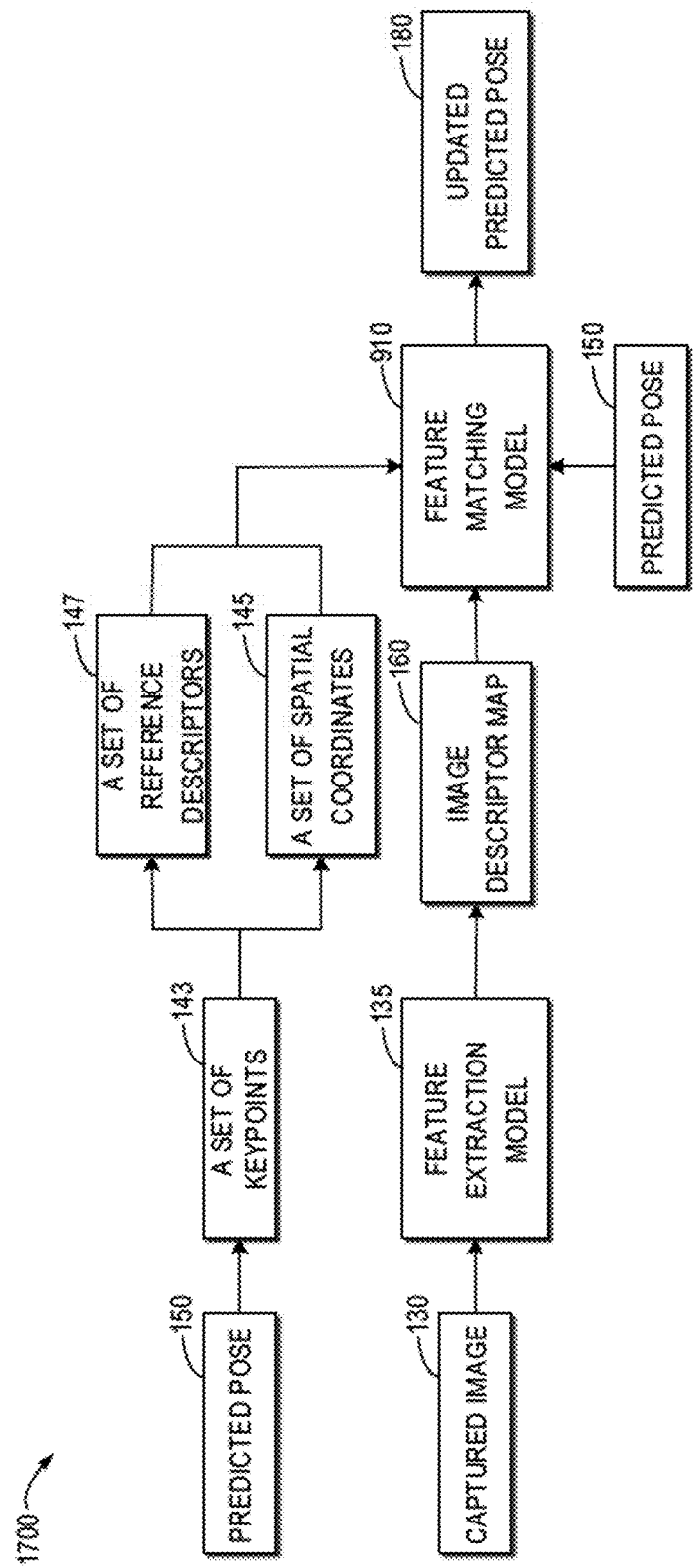
FIG. 17 illustrates an example modularized operation process of generating an updated predicted pose using a feature extraction model and a feature matching model, according to some embodiments of the present disclosure.

Example Process of Using Feature Extraction Model and Feature Matching Model for Vehicle Localization In some embodiments, the computing device 120 of the vehicle 110 may utilize both of the trained feature extraction model 135 and the trained feature matching model 910 to build a localization system for the vehicle 110. In those embodiments, the computing device 120 of the vehicle 110 may input a captured image 130 and a predicted pose 150 for the localization process of the vehicle 110 to the localization system, so as to locate the vehicle 110. Reference will be made to FIG. 17 below to describe the example. It should be appreciated that various functional modules or data units depicted in FIG. 17 are provided only as examples, without suggesting any limitation to the scope of the present disclosure. In other embodiments, the localization system for the vehicle 110, including the feature extraction model 135 and the feature matching model 910, may involve any other appropriate functional module or data unit.

FIG. 17 illustrates an example modularized operation process 1700 of generating an updated predicted pose 180 using a feature extraction model 135 and a feature matching model 910 according to some embodiments of the present disclosure. Hereinafter, referring to FIG. 1, the example operation process 1700 will be described by taking the computing device 120 generating the updated predicted pose 180 as an example, but it should be appreciated that the example operation process 1700 may be performed wholly or partly by other computing devices different than the computing device 120 to generate the updated predicted pose 180. It is worth noting that, according to the training scheme as described therein, actual localization data of the vehicle 110 actually measured and other related data actually measured in practice are used as training data to perform end-to-end training on the entire localization system, before the localization system built by the feature extraction model 135 and the feature matching model 910 is used for real-time localization of the vehicle 110, so as to determine various model parameters in the feature extraction model 135 and the feature matching model 910. In addition, as discussed above, the trained feature extraction model 135 may be used to generate a localization map 1230, and the generated localization map 1230 may be applied to real-time localization of the vehicle 110.

As shown in FIG. 17, during the localization process of the vehicle 110 based on a captured image 130 and a predicted pose 150, the computing device 120 may determine, based on the predicted pose 150, a set of keypoints 143 in a reference image 140 corresponding to the captured image 130. For example, based on the predicted pose 150 of the vehicle 110 when obtaining the captured image 130 by capturing an external environment 105, the computing device 120 may determine a reference image 140 corresponding to the captured image 130 from a set of reference images 1220 of the external environment 105. In some embodiments, among all the reference images of the set of reference images 1220, the pose of the capture vehicle 1210 when capturing the reference image 140 may be the closest to the predicted pose 150 of the vehicle 110. After determining the reference image 140, the computing device 120 may determine the set of keypoints 143 from the reference image 140 in various possible manners as described above.

Subsequent to obtaining the set of keypoints 143, the computing device 120 may determine a set of spatial coordinates 145 and a set of reference descriptors 147 corresponding to the set of keypoints 143 in the localization map 1230. Thereafter, the computing device 120 may input the set of spatial coordinates 145 and the set of reference descriptors 147 into the feature matching model 910. On the other hand, the computing device 120 may input the captured image 130 into the feature extraction model 135 to obtain an image descriptor map 160. The computing device 120 then may input the image descriptor map 160 into the feature matching model 910. Furthermore, the computing device 120 may input the predicted pose 150 of the vehicle 110 into the feature matching model 910. Based on the set of spatial coordinates 145, the set of reference descriptors 147, the predicted pose 150 and the image descriptor map 160, the feature matching model 910 may output an updated predicted pose 180.

As can be seen from the above, the localization system built from a feature extraction model 135 and a feature matching model 910 achieves a novel visual localization framework. In some embodiments, based on the localization system, an end-to end deep neural network (DNN) may be trained to extract machine learning-based feature descriptors, select keypoints from a localization map, perform feature matching on the selected keypoints and in real time images captured by the vehicle 110, and infer the real pose of the vehicle 110 through a differentiable cost volume. As compared with the conventional solutions, the architecture of the localization system allows joint training of various machine learning models or networks in the localization system by backpropagation and performs optimization towards the eventual goal of minimizing the absolute localization error. Furthermore, the localization system bypasses the repeatability crises in keypoint detectors in the conventional solutions in an efficient way.

In addition, by utilizing an end-to-end deep neural network for selecting keypoints, the localization system can find abundant features that are salient, distinctive and robust in the scene. The capability of full exploitation of these robust features enables the localization system to achieve centimeter-level localization accuracy, which is comparable to the latest LiDAR-based methods and substantially better than other vision-based localization methods in terms of both robustness and accuracy. The strong performance makes the localization system possible to be integrated into a self-driving vehicle, constantly providing precise localization results using low-cost sensors. The experiment results demonstrate that the localization system can achieve competitive localization accuracy when compared to the LiDAR-based localization solutions under various challenging circumstances, leading to a potential low-cost localization solution for autonomous driving.

Further, in some embodiments, the example modularized operation process 1700 for locating a vehicle, depicted in FIG. 17, and the example modularized operation process 1300 of generating a localization map, as depicted in FIG. 13, may be combined into a complete localization solution for a vehicle 110. For example, the localization solution may include a map generating module and an online localization module. As depicted in FIG. 13, the map generating module may use a set of reference images 1220 and a point cloud 610 as inputs, and may output a sparse keypoint map where each keypoint may carry information, such as a three-dimensional coordinate, descriptor, and the like. As depicted in FIG. 17, the online localization module may use a captured image 130, a predicted pose 150, and a part corresponding to the captured image 130 in the localization map as inputs, and may output localization information of the vehicle estimated by the online localization module. The training scheme of generating a loss function based on a localization result of a vehicle provided and performing end-to-end training, according to the embodiments of the present disclosure, is also applicable to the localization solution. In the localization solution, the online localization module and the map generating module can be trained simultaneously, and parameters of machine learning models as required by the online localization module and the map generating module can be obtained through efficient training, such that the localization solution can be improved significantly in localization accuracy and robustness.

Example Apparatus

Figure 18:
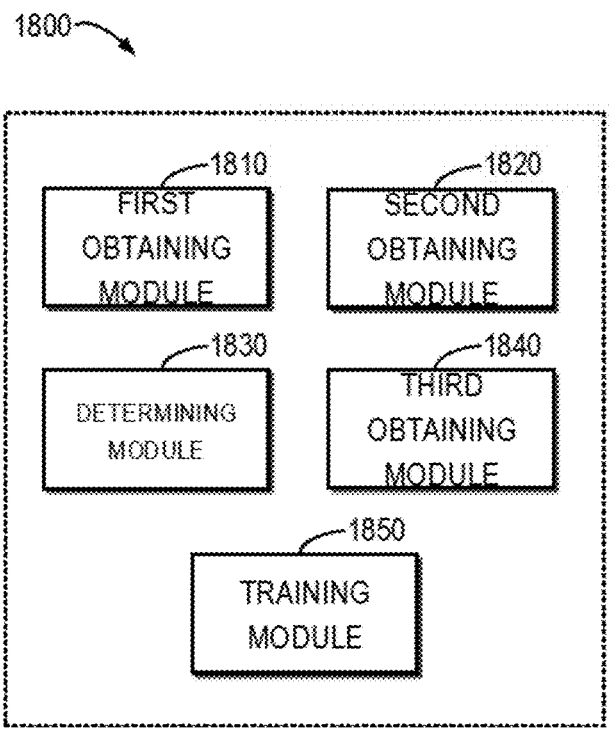
FIG. 18 illustrates a block diagram of an example apparatus for data processing according to some embodiments of the present disclosure.

FIG. 18 illustrates a block diagram of an example apparatus 1800 for data processing according to some embodiments of the present disclosure. In some embodiments, the apparatus 1800 may be included in the computing device 210 in FIG. 2 or implemented as the computing device 210.

As shown in FIG. 18, the apparatus 1800 may include the first obtaining module 1810, the second obtaining module 1820, a determining module 1830, the third obtaining module 1840, and a training module 1850. The first obtaining module 1810 may be configured to input a reference image and a captured image into a feature extraction module, respectively, to obtain a first descriptor map and the second descriptor map, where the captured image is obtained by capturing an external environment from a vehicle when the vehicle is in a real pose, and the reference image is obtained by pre-capturing the external environment by a capturing device. The second obtaining module 1820 may be configured to obtain, based on the first descriptor map, a set of reference descriptors corresponding to a set of keypoints in the reference image.

The determining module 1830 may be configured to determine a plurality of sets of training descriptors when the vehicle is in a plurality of training poses, respectively, where the plurality of sets of training descriptors belong to the second descriptor map, the set of spatial coordinates is determined based on the set of keypoints, and the plurality of training poses are obtained by offsetting a known pose based on the real pose. The third obtaining module 1840 may be configured to obtain a predicted pose of the vehicle by inputting the plurality of training poses and a plurality of similarities into a pose prediction module, where the plurality of similarities are between the plurality of sets of training descriptors and the set of reference descriptors. The training module 1850 may be configured to train the feature extraction model and the pose prediction model based on a metric representing a difference between the predicted pose and the real pose, in order to apply the trained feature extraction model and the trained pose prediction model to vehicle localization.

In some embodiments, the difference metric may include a deviation between the predicted pose and the real pose.

In some embodiments, the pose prediction model may provide, based on the plurality of similarities, probabilities that the plurality of training poses are real poses, respectively, and the difference metric may include a concentration of distribution of the probabilities.

In some embodiments, the pose prediction model may generate a plurality of regularized similarities based on the plurality of similarities, and the difference metric may be determined based on the plurality of regularized similarities.

In some embodiments, the second obtaining module 1820 may include: a reference image set obtaining module configured to obtain a set of reference images of the external environment, where each of the set of reference images includes a set of keypoints stored in association with a set of reference descriptors and a set of spatial coordinates, and the set of spatial coordinates is determined by projecting a laser radar point cloud onto the reference images; a selection module configured to select, from the set of reference images, the reference image corresponding to the captured image based on the known pose; and a reference descriptor set and spatial coordinate set obtaining module configured to obtain the set of reference descriptors and the set of spatial coordinates stored in association with the set of keypoints in the reference image.

In some embodiments, the determining module 1830 may include: a projection point set determining module configured to determine a set of projection points of the set of spatial coordinates by projecting the set of spatial coordinates onto the captured image based on a first training pose of the plurality of training poses; a neighboring point determining module configured to determine, for a projection point of the set of projection points, a plurality of points adjacent to the projection point in the captured image; a descriptor determining module configured to determine a plurality of descriptors of the plurality of points in the second descriptor map; and a training descriptor obtaining module configured to determine, based on the plurality of descriptors, a descriptor of the projection point to obtain a first training descriptor of the set of training descriptors corresponding to the first training pose among the plurality of sets of training descriptors.

In some embodiments, the apparatus 1800 may further include: a difference determining module configured to determine, for a first set of training descriptors among the plurality of sets of training descriptors, a plurality of differences between a plurality of training descriptors in the first set of training descriptors and corresponding reference descriptors in the set of reference descriptors; and a similarity determining module configured to determine, based on the plurality of differences, a similarity between the first set of training descriptors and the set of reference descriptors as a first similarity of the plurality of similarities.

In some embodiments, the third obtaining module may include: a probability determining module configured to determine, based on the plurality of similarities, probabilities that the plurality of training poses are real poses, respectively, using the pose prediction model; and an expected pose determining module configured to determine, based on the plurality of training poses and the probabilities, an expected pose of the vehicle as the predicted pose.

In some embodiments, the apparatus 1800 may further include: a training pose determining module configured to determine the plurality of training poses by taking a horizontal coordinate, a longitudinal coordinate and a yaw angle of the known pose as a center and by offsetting from the center in three dimensions of a horizontal axis, a longitudinal axis and a yaw angle axis, with respective predetermined offset units and within respective predetermined maximum offset ranges.

In some embodiments, the apparatus 1800 may also include: a keypoint set selection module configured to select, based on a farthest point sampling algorithm, the set of keypoints from a set of points in a reference image.

Example Device

Figure 19:
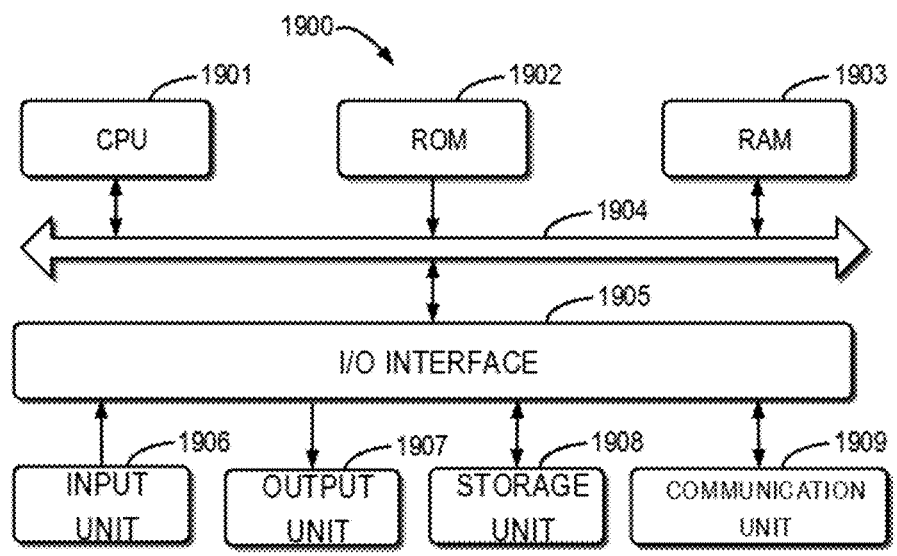
FIG. 19 illustrates a block diagram of an example device that can be used to implement embodiments of the present disclosure.

FIG. 19 illustrates a block diagram of an example device 1900 that can be used to implement embodiments of the present disclosure. As shown, the device 1900 includes a central processing unit (CPU) 1901 which performs various appropriate actions and processing, based on computer program instructions stored in a read-only memory (ROM) 1902 or computer program instructions loaded from a storage unit 1908 to a random access memory (RAM) 1903. The RAM 1903 stores therein various programs and data required for operations of the device 1900. The CPU 1901, the ROM 1902 and the RAM 1903 are connected via a bus 1904 with one another. An input/output (I/O) interface 1905 is also connected to the bus 1904.

The following components in the device 1900 are connected to the I/O interface 1905: an input unit 1906 such as a keyboard, a mouse, and the like; an output unit 1907 including various kinds of displays and a loudspeaker, etc.; a storage unit 1908 including a magnetic disk, an optical disk, and, etc.; a communication unit 1909 including a network card, a modem, and a wireless communication transceiver, etc. The communication unit 1909 allows the device 1900 to exchange information/data with other devices through a computer network such as the Internet and/or various kinds of telecommunications networks.

Various processes and processing described above, for example, the example process 300, 1100 or 1400, may be executed by the processing unit 1901. For example, in some embodiments, the example process 300, 1100 or 1400 may be implemented as a computer software program that is tangibly included in a machine readable medium, for example, the storage unit 1908. In some embodiments, part or all of the computer programs may be loaded and/or mounted onto the device 1900 via the ROM 1902 and/or communication unit 1909. When the computer program is loaded to the RAM 1903 and executed by the CPU 1901, one or more steps of the example process 300, 1100 or 1400 as described above may be executed.

Others

As used herein, the term "includes" and its variants are to be read as open terms that mean "includes, but is not limited to." The term "based on" is to be read as "based at least in part on." The term "one example embodiment" and "the example embodiment" are to be read as "at least one embodiment." The terms "first," "second," and the like may refer to different or same objects. Other definitions, explicit and implicit, may be included in the context.

As used herein, the term "determining" covers various acts. For example, "determining" may include operation, calculation, processing, derivation, investigation, search (e.g., search through a table, a database or a further data structure), identification, and the like. In addition, "determining" may include receiving (e.g., receiving information), accessing (e.g., accessing data in the memory), and the like. Further, "determining" may include resolving, selecting, choosing, establishing, and the like.

It should be noted that the embodiments of the present disclosure can be implemented in software, hardware, or a combination thereof. The hardware part can be implemented by a special logic; the software part can be stored in a memory and executed by a suitable instruction execution system such as a microprocessor or special purpose hardware. Those skilled in the art should appreciate that the above apparatus and method may be implemented with computer executable instructions and/or in processor-controlled code, and for example, such code is provided on a carrier medium such as a programmable memory or an optical or electronic signal bearer.

Further, although operations of the present methods are described in a particular order in the drawings, it does not require or imply that these operations are necessarily performed according to this particular sequence, or an expected outcome can only be achieved by performing all shown operations. Rather, the execution order for the steps depicted in the flowcharts may be varied. Additionally or alternatively, some steps may be omitted, a plurality of steps may be merged into one step, or a step may be divided into a plurality of steps for execution. It should be appreciated that features and functions of two or more devices according to embodiments of the present disclosure can be implemented in combination in a single device. Conversely, various features and functions that are described in the context of a single device may also be implemented in multiple devices.

Although the present disclosure has been described with reference to various embodiments, it should be understood that the present disclosure is not limited to the disclosed example embodiments. The present disclosure is intended to cover various modifications and equivalent arrangements included in the spirit and scope of the appended claims.

The various embodiments described above can be combined to provide further embodiments. Aspects of the embodiments can be modified to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A data processing method, comprising:
inputting a reference image and a captured image into a feature extraction model, respectively, to obtain a first descriptor map and a second descriptor map, the captured image being obtained by capturing an external environment from a vehicle when the vehicle is in a real pose, the reference image being obtained by pre-capturing the external environment by a capturing device;
obtaining, based on the first descriptor map, a set of reference descriptors corresponding to a set of keypoints in the reference image;
determining a plurality of sets of training descriptors corresponding to a set of spatial coordinates when the vehicle is in a plurality of training poses, respectively, the plurality of sets of training descriptors belonging to the second descriptor map, the set of spatial coordinates being determined based on the set of keypoints, the plurality of training poses being obtained by offsetting a known pose based on the real pose;
obtaining a predicted pose of the vehicle by inputting the plurality of training poses and a plurality of similarities into a pose prediction model, the plurality of similarities being between the plurality of sets of training descriptors and the set of reference descriptors; and
training the feature extraction model and the pose prediction model based on a metric representing a difference between the predicted pose and the real pose, in order to apply the trained feature extraction model and the trained pose prediction model to vehicle localization,
wherein one of the following:
the pose prediction model provides, based on the plurality of similarities, probabilities that the plurality of training poses are real poses, respectively, and the metric comprises a concentration of distribution of the probabilities; or
the pose prediction model generates a plurality of regularized similarities based on the plurality of similarities, and the metric is determined based on the plurality of regularized similarities.

2. The method of claim 1, wherein the metric comprises a deviation between the predicted pose and the real pose.

3. The method of claim 1, wherein obtaining the set of reference descriptors comprises:

obtaining a set of reference images of the external environment, each of the set of reference images comprising a set of keypoints as well as a set of reference descriptors and a set of spatial coordinates associated with the set of keypoints, the set of spatial coordinates being determined by projecting a laser radar point cloud onto the reference image;

selecting, from the set of reference images, the reference image corresponding to the captured image based on the known pose; and obtaining the set of reference descriptors and the set of spatial coordinates stored in association with the set of keypoints in the reference image.

4. The method of claim 1, wherein determining the plurality of sets of training descriptors comprises:

determining a set of projection points of the set of spatial coordinates by projecting the set of spatial coordinates onto the captured image based on a first training pose of the plurality of training poses;

determining, for a projection point of the set of projection points, a plurality of points adjacent to the projection point in the captured image;

determining a plurality of descriptors of the plurality of points in the second descriptor map; and determining, based on the plurality of descriptors, a descriptor of the projection point to obtain a first training descriptor of a set of training descriptors corresponding to the first training pose among the plurality of sets of training descriptors.

5. The method of claim 1, further comprising:

determining, for a first set of training descriptors among the plurality of sets of training descriptors, a plurality of differences between a plurality of training descriptors in the first set of training descriptors and corresponding reference descriptors in the set of reference descriptors; and determining, based on the plurality of differences, a similarity between the first set of training descriptors and the set of reference descriptors as a first similarity of the plurality of similarities.

6. The method of claim 1, wherein obtaining the predicted pose comprises:

determining, based on the plurality of similarities, probabilities that the plurality of training poses are real poses, respectively, using the pose prediction model; and determining, based on the plurality of training poses and the probabilities, an expected pose of the vehicle as the predicted pose.

7. The method of claim 1, further comprising:

determining the plurality of training poses by taking a horizontal coordinate, a longitudinal coordinate and a yaw angle of the known pose as a center and by offsetting from the center in three dimensions of a horizontal axis, a longitudinal axis and a yaw angle axis, with respective predetermined offset units and within respective predetermined maximum offset ranges.

8. The method of claim 1, further comprising:

selecting, based on a farthest point sampling algorithm, the set of keypoints from a set of points in the reference image.

9. An electronic device, comprising:

at least one processor; and at least one memory coupled to the at least one processor and storing instructions executable by the at least one processor, the instructions, when executed by the at least one processor, causing the electronic device to:

input a reference image and a captured image into a feature extraction model, respectively, to obtain a first descriptor map and a second descriptor map, the captured image being obtained by capturing an external environment from a vehicle when the vehicle is in a real pose, the reference image being obtained by pre-capturing the external environment by a capturing device;

obtain, based on the first descriptor map, a set of reference descriptors corresponding to a set of keypoints in the reference image;

determine a plurality of sets of training descriptors corresponding to a set of spatial coordinates when the vehicle is in a plurality of training poses, respectively, the plurality of sets of training descriptors belonging to the second descriptor map, the set of spatial coordinates being determined based on the set of keypoints, the plurality of training poses being obtained by offsetting a known pose based on the real pose;

obtain a predicted pose of the vehicle by inputting the plurality of training poses and a plurality of similarities into a pose prediction model, the plurality of similarities being between the plurality of sets of training descriptors and the set of reference descriptors; and train the feature extraction model and the pose prediction model based on a metric representing a difference between the predicted pose and the real pose, in order to apply the trained feature extraction model and the trained pose prediction model to vehicle localization, wherein one of the following:

the pose prediction model provides, based on the plurality of similarities, probabilities that the plurality of training poses are real poses, respectively, and the metric comprises a concentration of distribution of the probabilities; or the pose prediction model generates a plurality of regularized similarities based on the plurality of similarities, and the metric is determined based on the plurality of regularized similarities.

10. The electronic device of claim 9, wherein the metric comprises a deviation between the predicted pose and the real pose.

11. The electronic device of claim 9, wherein the instructions when executed by the at least one processor cause the electronic device to obtain the set of reference descriptors by:

obtaining a set of reference images of the external environment, each of the set of reference images comprising a set of keypoints as well as a set of reference descriptors and a set of spatial coordinates associated with the set of keypoints, the set of spatial coordinates being determined by projecting a laser radar point cloud onto the reference image;

selecting, from the set of reference images, the reference image corresponding to the captured image based on the known pose; and obtaining the set of reference descriptors and the set of spatial coordinates stored in association with the set of keypoints in the reference image.

12. The electronic device of claim 9, wherein the instructions when executed by the at least one processor cause the electronic device to determine the plurality of sets of training descriptors by:
- determining a set of projection points of the set of spatial coordinates by projecting the set of spatial coordinates onto the captured image based on a first training pose of the plurality of training poses;
- determining, for a projection point of the set of projection points, a plurality of points adjacent to the projection point in the captured image;
- determining a plurality of descriptors of the plurality of points in the second descriptor map; and
- determining, based on the plurality of descriptors, a descriptor of the projection point to obtain a first training descriptor of a set of training descriptors corresponding to the first training pose among the plurality of sets of training descriptors.

13. The electronic device of claim 9, wherein the instructions when executed by the at least one processor cause the electronic device to:
- determine, for a first set of training descriptors among the plurality of sets of training descriptors, a plurality of differences between a plurality of training descriptors in the first set of training descriptors and corresponding reference descriptors in the set of reference descriptors; and
- determine, based on the plurality of differences, a similarity between the first set of training descriptors and the set of reference descriptors as a first similarity of the plurality of similarities.

14. The electronic device of claim 9, wherein the instructions when executed by the at least one processor cause the electronic device to obtain the predicted pose by:
- determining, based on the plurality of similarities, probabilities that the plurality of training poses are real poses, respectively, using the pose prediction model; and
- determining, based on the plurality of training poses and the probabilities, an expected pose of the vehicle as the predicted pose.

15. The electronic device of claim 9, wherein the instructions when executed by the at least one processor cause the electronic device to:
- determine the plurality of training poses by taking a horizontal coordinate, a longitudinal coordinate and a yaw angle of the known pose as a center and by offsetting from the center in three dimensions of a horizontal axis, a longitudinal axis and a yaw angle axis, with respective predetermined offset units and within respective predetermined maximum offset ranges.

16. A non-transitory computer-readable storage medium with computer instructions stored thereon, the computer instructions, when executed in a device, causing the device to perform acts comprising:
- inputting a reference image and a captured image into a feature extraction model, respectively, to obtain a first descriptor map and a second descriptor map, the captured image being obtained by capturing an external environment from a vehicle when the vehicle is in a real pose, the reference image being obtained by pre-capturing the external environment by a capturing device;
- obtaining, based on the first descriptor map, a set of reference descriptors corresponding to a set of keypoints in the reference image;
- determining a plurality of sets of training descriptors corresponding to a set of spatial coordinates when the vehicle is in a plurality of training poses, respectively, the plurality of sets of training descriptors belonging to the second descriptor map, the set of spatial coordinates being determined based on the set of keypoints, the plurality of training poses being obtained by offsetting a known pose based on the real pose;
- obtaining a predicted pose of the vehicle by inputting the plurality of training poses and a plurality of similarities into a pose prediction model, the plurality of similarities being between the plurality of sets of training descriptors and the set of reference descriptors; and
- training the feature extraction model and the pose prediction model based on a metric representing a difference between the predicted pose and the real pose, in order to apply the trained feature extraction model and the trained pose prediction model to vehicle localization, wherein one of the following:
- the pose prediction model provides, based on the plurality of similarities, probabilities that the plurality of training poses are real poses, respectively, and the metric comprises a concentration of distribution of the probabilities; or
- the pose prediction model generates a plurality of regularized similarities based on the plurality of similarities, and the metric is determined based on the plurality of regularized similarities.

17. The non-transitory computer-readable storage medium of claim 16, wherein the metric comprises a deviation between the predicted pose and the real pose.

18. The non-transitory computer-readable storage medium of claim/0, wherein obtaining the set of reference descriptors comprises:
- obtaining a set of reference images of the external environment, each of the set of reference images comprising a set of keypoints as well as a set of reference descriptors and a set of spatial coordinates associated with the set of keypoints, the set of spatial coordinates being determined by projecting a laser radar point cloud onto the reference image;
- selecting, from the set of reference images, the reference image corresponding to the captured image based on the known pose; and
- obtaining the set of reference descriptors and the set of spatial coordinates stored in association with the set of keypoints in the reference image.

19. The non-transitory computer-readable storage medium of claim 16, wherein determining the plurality of sets of training descriptors comprises:
- determining a set of projection points of the set of spatial coordinates by projecting the set of spatial coordinates onto the captured image based on a first training pose of the plurality of training poses;
- determining, for a projection point of the set of projection points, a plurality of points adjacent to the projection point in the captured image;
- determining a plurality of descriptors of the plurality of points in the second descriptor map; and
- determining, based on the plurality of descriptors, a descriptor of the projection point to obtain a first training descriptor of a set of training descriptors corresponding to the first training pose among the plurality of sets of training descriptors.

20. The non-transitory computer-readable storage medium of claim 16, wherein the acts further comprise:

determining, for a first set of training descriptors among the plurality of sets of training descriptors, a plurality of differences between a plurality of training descriptors in the first set of training descriptors and corresponding reference descriptors in the set of reference descriptors; and determining, based on the plurality of differences, a similarity between the first set of training descriptors and the set of reference descriptors as a first similarity of the plurality of similarities.

\* \* \* \* \*